United States Patent
Saji

(10) Patent No.: US 8,339,816 B2
(45) Date of Patent: Dec. 25, 2012

(54) SEMICONDUCTOR DEVICE AND SWITCHING POWER SUPPLY APPARATUS

(75) Inventor: Takashi Saji, Shiga (JP)

(73) Assignee: Panasonic Corporation, Osaka (JP)

(*) Notice: Subject to any disclaimer, the term of this patent is extended or adjusted under 35 U.S.C. 154(b) by 384 days.

(21) Appl. No.: 12/726,808

(22) Filed: Mar. 18, 2010

(65) Prior Publication Data
US 2010/0315841 A1    Dec. 16, 2010

(30) Foreign Application Priority Data

Jun. 11, 2009  (JP) .................. 2009-140600

(51) Int. Cl.
*H02M 3/335* (2006.01)
(52) U.S. Cl. ............... 363/21.16; 363/21.12; 363/21.17
(58) Field of Classification Search ............ 363/18, 363/19, 20, 21.01, 21.04, 21.07, 21.09, 21.1, 363/21.11, 21.12, 21.16, 21.17
See application file for complete search history.

(56) References Cited

U.S. PATENT DOCUMENTS

| | | | |
|---|---|---|---|
| 7,116,564 B2* | 10/2006 | Takahashi | 363/21.16 |
| 7,202,609 B2 | 4/2007 | Langeslag et al. | |
| 7,394,669 B2 | 7/2008 | Fahlenkamp et al. | |
| 7,394,670 B2* | 7/2008 | Koike | 363/21.16 |
| 7,545,654 B2 | 6/2009 | Berghegger | |
| 7,778,050 B2* | 8/2010 | Yamashita | 363/21.16 |
| 2005/0122056 A1 | 6/2005 | Langeslag et al. | |
| 2006/0171179 A1 | 8/2006 | Hall et al. | |
| 2009/0116265 A1 | 5/2009 | Saji | |
| 2010/0039087 A1 | 2/2010 | Sakimura et al. | |
| 2010/0061124 A1* | 3/2010 | Gong et al. | 363/21.04 |
| 2010/0085776 A1 | 4/2010 | Mimura | |

FOREIGN PATENT DOCUMENTS

| | | |
|---|---|---|
| JP | 2005-518177 | 6/2005 |
| WO | 03/069767 | 8/2003 |

OTHER PUBLICATIONS

Fuji Electric Co., Ltd. Catalogue, "Fuji Switching Power Supply Control IC FA5540/5541/5542 Application Note", Jul. 2007, pp. 1-32.

* cited by examiner

*Primary Examiner* — Nguyen Tran
(74) *Attorney, Agent, or Firm* — McDermott Will & Emery LLP

(57) ABSTRACT

A switching power supply apparatus includes: a turn-on control circuit which generates a turn-on signal; a feedback control circuit which generates a reference voltage $V_{EAO}$ indicating a limitation level for a current $I_D$ flowing into a switching element, by referring to a feedback signal $I_{FB}$ indicating an output current voltage $V_{OUT}$, the limitation level which decreases as the output direct current voltage becomes greater; an overcurrent protection level setting circuit which generates a reference voltage $V_{LR}$ indicating an overcurrent protection level; a current detecting terminal; an offset current generating circuit which provides an offset current $I_{IS}$ from the current detecting terminal, the offset current $I_{IS}$ which is greater as the output current voltage $V_{OUT}$ is greater; and a turn-off control circuit which generates a turn-off signal by comparing a voltage applied to the current detecting terminal with each of the reference voltage $V_{EAO}$, and the reference voltage $V_{LR}$.

7 Claims, 17 Drawing Sheets

SEMICONDUCTOR DEVICE AND SWITCHING POWER SUPPLY APPARATUS

BACKGROUND OF THE INVENTION (1) Field of the Invention

The present invention relates to (i) a switching power supply apparatus which: generates a regulated output direct current voltage by causing a switching element to switch an input direct current voltage on and off, and (ii) a semiconductor device used for switching power supply control.

(2) Description of the Related Art

Switching power supply apparatuses equipped with semiconductor devices have been widely used for household equipment, such as electric appliances, as its power supply apparatuses in order to reduce its electric consumption and improve its power efficiency. The semiconductor devices utilize a switching operation performed by a switching element, such as a transistor, to control an output voltage.

Recently, in particular, global warming prevention measures have seen a significant attention to the reduction of the stand-by electricity that the apparatuses, such as the household appliances, require. This generates a great demand for a switching power supply apparatus consuming less stand-by electricity.

In most cases, a typical energy loss of a switching power supply under the light load, such as a stand-by load, is due to a switching loss caused by the switching operation. One of the techniques to improve power efficiency under the light load is to employ intermittent oscillation control under the light load to operate the switching power supply apparatus.

FIG. 1 is a block diagram exemplifying a structure of a switching power supply apparatus 800 including a semiconductor device having a conventional intermittent oscillation control circuit.

FIG. 2 is a timing diagram exemplifying an operation of the switching power supply apparatus 800.

Described briefly below with reference to FIGS. 1 and 2 is an operation on the switching power supply apparatus 800 during an intermittent oscillation period. The switching power supply apparatus 800 is assumed to execute pulse width modulation (PWM) control of a current mode at, for example, a switching frequency of 100 kHz during a normal operation.

In the switching power supply apparatus 800 shown in FIG. 1, as the load current $I_{out}$ having been outputted since the load rated state shown in FIG. 2, decreases under the load varying state, the output voltage $V_{out}$ increase. A feedback signal (a current $I_{FB}$ which increases as the output voltage $V_{out}$ increases) is inputted from an output voltage detecting circuit 5 to an FB terminal. Based on a degree of the current $I_{FB}$, a feedback control circuit 11 outputs a control signal $V_{EAO}$ indicating a smaller limiting value with respect to a current $I_D$ flowing into a switching element 2 as the output voltage $V_{out}$ is greater. A further decreasing load current $I_{out}$ activates an intermittent oscillation control circuit 16 to cause the intermittent oscillation control circuit 16 to input an Enable signal into a turn-on control circuit 18, the Enable signal which alternatively indicates suspension and execution of the switching operation. This switches the switching power supply apparatus 800 into the intermittent oscillation control, as shown in a first stand-by state in FIG. 2, which involves the suspension and execution of the switching operation on the switching element 2. Moreover, an output load current smaller than that observed in the first stand-by state initiates a second stand-by state having a longer suspension period than the first stand-by period has. In other words, the blocking cycle, including an execution period and a suspension period of the switching operation on the switching element 2, is controlled to be longer as the load is lighter. Hence, the switching power supply apparatus 800 improves in power supply efficiency under the light load, using the intermittent oscillation control performed under the light load.

During the normal operation, the above switching operation is executed at 100 kHz. During the intermittent oscillation control state, however, the frequency in the oscillation control, which involves switching between the execution period and the suspension period of the switching on the switching element 2, is for example 20 kHz or below representing an audio-frequency range. As a result, noise may be generated from a transformer or a condenser typically used for the switching power supply. In addition, a lower frequency for the blocking control causes greater output ripple and the resulting deterioration in stability of the output voltage, which may results in failure to meet power supply specifications.

In other words, performing the intermittent oscillation control under the light load is effective in improving power supply efficiency under the light load; however, this lowers the frequency of the breaking control to the audio-frequency range, which causes drawbacks such as the noise from the transformer and the greater output ripple.

One of known counter measures is to lower a peak current value of the switching element during the intermittent oscillation period. Excessively lowering the peak current value in the intermittent oscillation increases the number of switching times during the intermittent oscillation, which makes improvement in the power supply efficiency rather ineffective. In other words, determined by the peak current value of the switching element during the intermittent oscillation is trade-off relationship between noises caused by a transformer and output ripple.

The optimum peak current value of the switching element during the intermittent oscillation period varies in different switching power supply apparatuses since (i) a certain degree of peak current value can be tolerated in the case where the noise can be reduced by using a bonded or an impregnated transformer, and (ii) a peak current value needed to avoid excessive increase in the number of switching times in the intermittent oscillation varies depending on an assumed load. Thus, the peak current value of the switching element in the intermittent oscillation can be desirably set easily at the choice of a designer of the switching power supply apparatus.

Non-Patent Reference 1 (Fuji Electric Co., Ltd. Catalogue "Fuji Switching Power Supply Control IC FA5540/5541/5542 Application Note" (July 2007)) discloses an effective switching power supply apparatus which meets the above demands.

FIG. 3 is a block diagram showing a structural example of a switching power supply apparatus 900 built with an application of the technique disclosed in Non-Patent Reference 1 to the conventional switching power supply apparatus 800.

The switching power supply apparatus 900 is the switching power supply apparatus 800 additionally including a structure disclosed in Non-Patent Reference 1. In the structure, a constant current source 444 is incorporated in a switching element current detecting terminal IS, and a constant current flows from the switching element current detecting terminal IS.

An offset adjusting resistor 45 is inserted between (i) a switching element current detecting circuit (current detecting resistor 46) detecting a current flowing through the switching element 2 and (ii) the switching element current detecting terminal IS. Here, an offset effect is observed due to a voltage generated by the product of a value of the offset adjusting resistor 45 and a current value of the constant current source 444. Because of the offset effect, a greater resistor value of the offset adjusting resistor 45 nominally provides a greater switching element current detecting value.

This allows a power supply apparatus designer to easily adjust the peak current value of the switching element 2 during the intermittent oscillation period with a use of the resistor value of the offset adjusting resistor 45, which makes possible realizing a switching power supply apparatus executing the most suitable intermittent oscillation control under the light load.

SUMMARY OF THE INVENTION

The conventional switching power supply apparatus 900 with the technique disclosed in Non-Patent Reference 1 applied also adjusts a peak current value of the switching element observed outside the intermittent oscillation period, as well as adjusting the peak current value of the switching element during the intermittent oscillation period. This causes the following troubles, for example.

In the case where the switching power supply apparatus is capable of overcurrent protection, adjusted as well is the maximum peak current value of the switching element to which the overcurrent protection is provided. This means that when the current value of the constant current source and the resistor value of the offset adjusting resistor vary due to production tolerance and temperature characteristics, the overcurrent protection level varies, so does the maximum output of the switching power supply apparatus.

FIG. 4 graphically shows an offset current $I_{IS}$ and a peak current value $I_{DP}$ flowing into the switching element both for a feedback current $I_{FB}$. The peak current value $I_{DP}$ represents three kinds of values for the offset adjusting resistor $R_{IS}$.

While the change of the offset adjusting resistor causes the peak current value of the switching element to vary during the intermittent oscillation period ($I_{FB}=I_{FB1}$), the change also causes the maximum peak current value of the switching element to vary when the overcurrent protection is provided ($I_{FB}<I_{FB0}$).

The present invention is conceived in view of the above problems and has as an object to provide: a switching power supply apparatus which (i) allows an easy adjustment of a peak value of a current flowing into a switching element during an intermittent oscillation operation, and (ii) shows few variations in overcurrent protection level with the peak value adjusted; and a semiconductor device used for switching power supply control.

In order to solve the above problems, an aspect of a semiconductor device used for controlling a switching power supply apparatus, in accordance with the present invention, which supplies a regulated output direct current voltage to a load by causing a switching element to switch an input direct current voltage on and off includes: a turn-on control circuit which generates a turn-on signal which is used for periodically turning on the switching element; a feedback control circuit which generates a first reference voltage indicating a limitation level value for a current flowing into the switching element, by referring to a feedback signal indicating a degree of the output direct current voltage, the limitation level value decreasing as the output direct current voltage becomes greater; a current detecting terminal to which a sense voltage is applied, the sense voltage being greater as the current flowing into the switching element is greater; an offset current generating circuit which provides an offset current from the current detecting terminal, the offset current being greater as the output direct current voltage indicated by the feedback signal is greater; a turn-off control circuit which generates a turn-off signal which is used for turning off the switching element, by comparing the sense voltage applied to the current detecting terminal with the first reference voltage; and a driving circuit which turns on and off the switching element according to the turn-on signal and the turn-off signal.

The semiconductor device used for controlling switching power supply may include: an overcurrent protection level setting circuit which generates a second reference voltage indicating an overcurrent protection level value for the current flowing into the switching element; and an intermittent oscillation control circuit which keeps the switching element off in the case where the first reference voltage is small enough to satisfy a predetermined reference, wherein the turn-off control circuit may generate the turn-off signal, by comparing the sense voltage applied to the current detecting terminal with each of the first reference voltage, and the second reference voltage.

The offset current generating circuit may generate the offset current of which value continuously varies in conformity with variation in the feedback signal.

The offset current generating circuit may generate the offset current of which value continuously increases as the first reference voltage decreases. The offset current generating circuit may reduce the value of the offset current to 0 in the case where the first reference voltage becomes greater than the second reference voltage.

The intermittent oscillation control circuit may keep the switching element off, by outputting an enable signal which is used for masking the turn-on signal, and the offset current generating circuit may hold the value of the offset current 0 while the enable signal keeps the switching element off.

The present invention may be realized as a switching power supply apparatus including the semiconductor device used for the switching power supply control, as well as the semiconductor device used for the switching power supply control.

The semiconductor device used for the switching power supply control in accordance with the present invention includes the current detecting terminal to which a greater sense voltage is applied as a greater current flows into the switching element. The offset current generating circuit provides a greater offset current from the current detecting terminal as the feedback signal indicates a greater output direct current voltage.

Such a structure sees the offset adjusting resistor, having a desired resistor value, inserted between an output of the current detecting circuit generating the sense voltage and the current detecting terminal. This causes a voltage, having the sense voltage with an offset voltage added, to be applied to the current detecting terminal. Here, the offset voltage is determined by an offset current and the offset adjusting resistor. Thus, as the current value flowing into the switching element is detected nominally larger, the actual current value is adjusted to be smaller.

The offset current is great in the case of the light load having a great output direct current voltage. Thus, under the light load for example, more frequent intermittent switching operations by the switching element involve more appropriate adjustment to the peak value of the current flowing into the switching element according to a resistor value of the offset adjusting resistor.

Further, the offset current reduces (preferably to 0) in the case of the heavy load having a small output direct current voltage. Under the heavy load which initializes the overcurrent protection, the peak value of the current flowing into the switching element is rarely affected, or not affected at all, by the offset adjusting resistor.

The result provides the switching power supply apparatus and the semiconductor device used for the switching power supply control which make possible (i) facilitating an adjustment in the peak value of the current flowing into the switching element during the intermittent oscillation, and (ii) showing few variations in overcurrent protection level when the peak value is adjusted.

FURTHER INFORMATION ABOUT TECHNICAL BACKGROUND TO THIS APPLICATION

The disclosure of Japanese Patent Application No. 2009-140600 filed on Jun. 11, 2009 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate specific embodiments of the invention. In the Drawings.

DESCRIPTION OF THE PREFERRED EMBODIMENTS

Hereinafter, a semiconductor device and a switching power supply apparatus in accordance with embodiments of the present invention shall be described in detail with reference to the drawings.

Embodiment 1

Described shall be a switching power supply apparatus in accordance with Embodiment 1 of the present invention.

Figure 1:
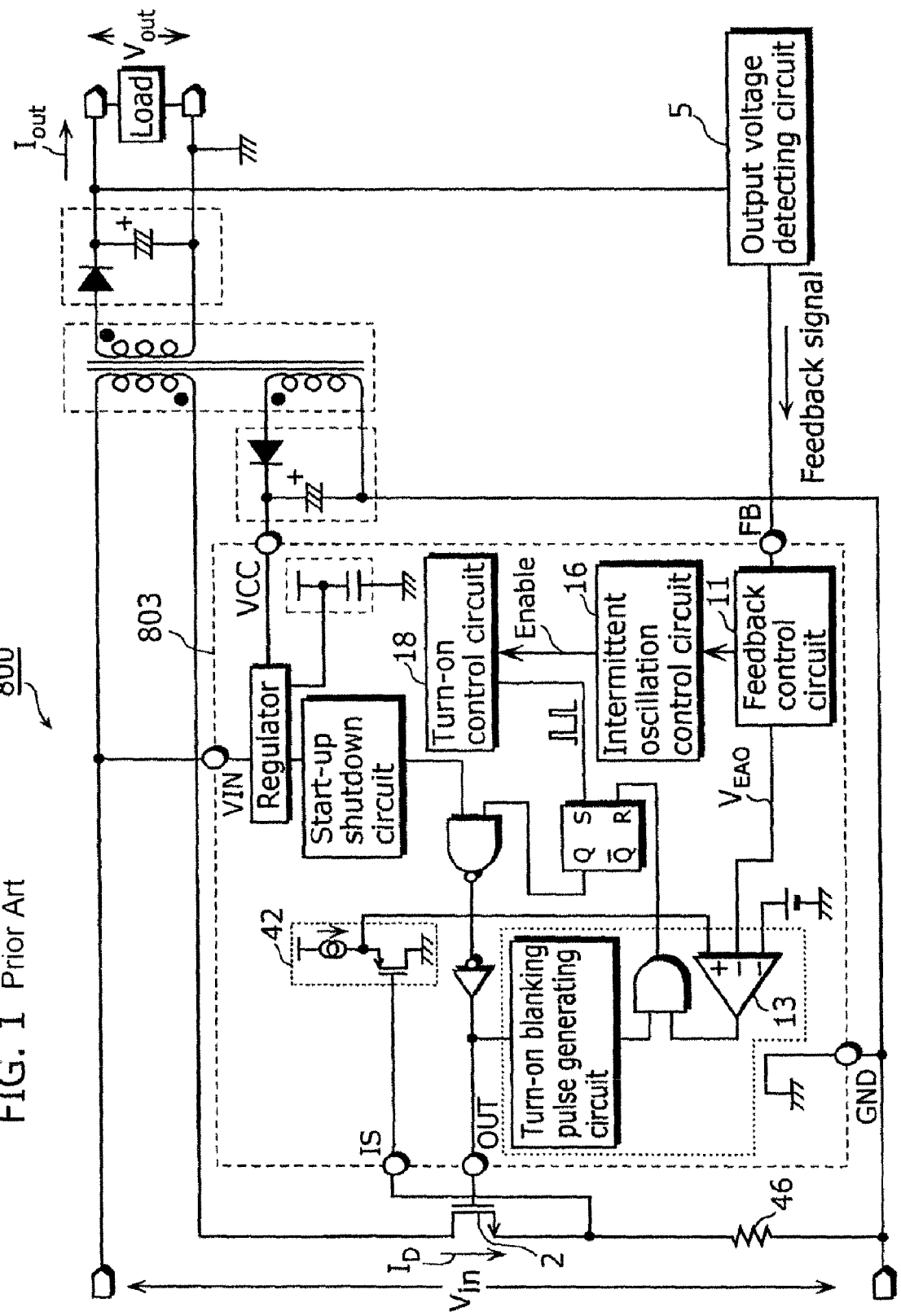
FIG. 1 shows a circuit diagram exemplifying a structure of a conventional switching power supply apparatus.
Figure 2:
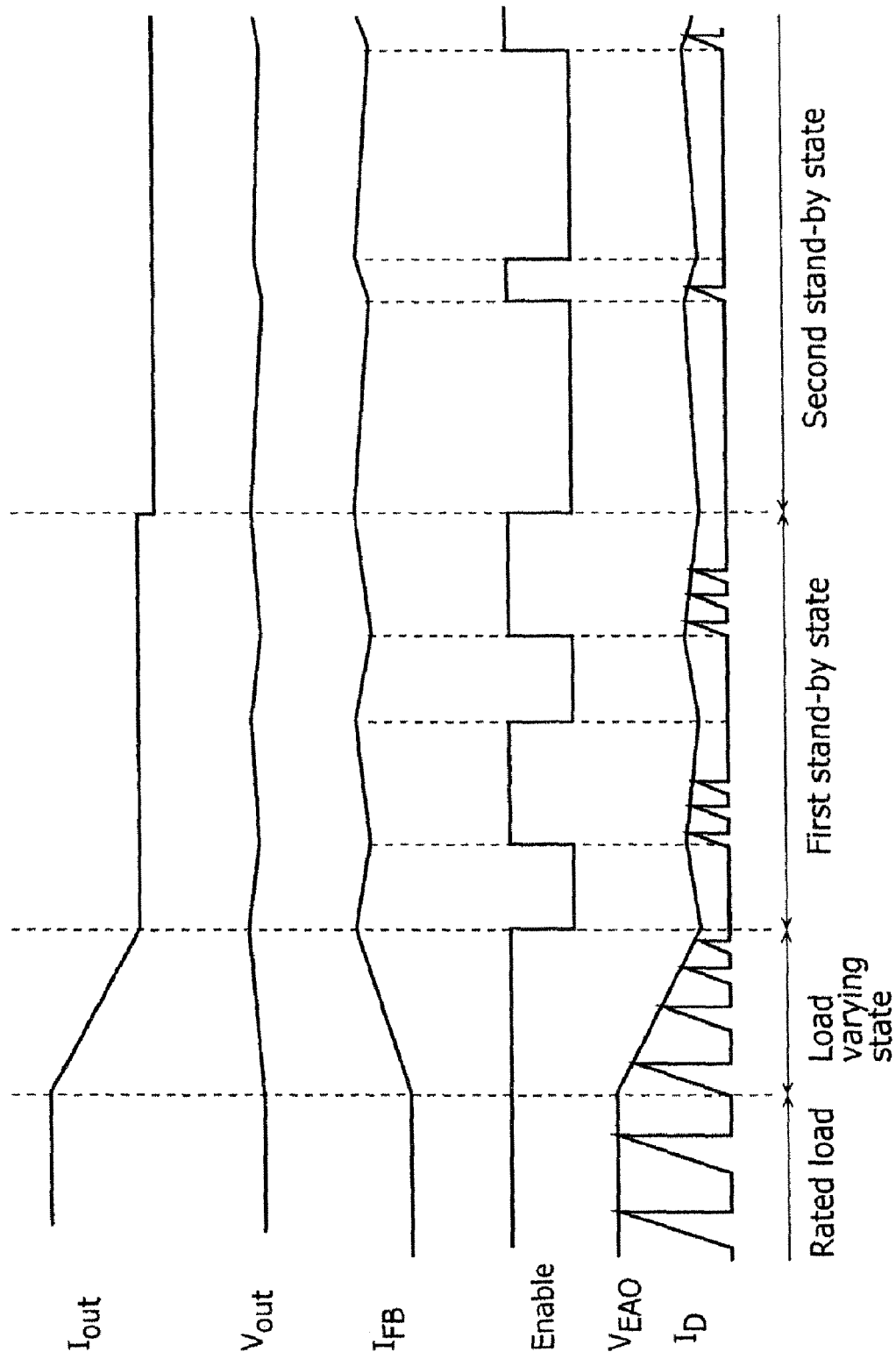
FIG. 2 is a timing diagram illustrating intermittent oscillation of a switching element in the conventional switching power supply apparatus.
Figure 3:
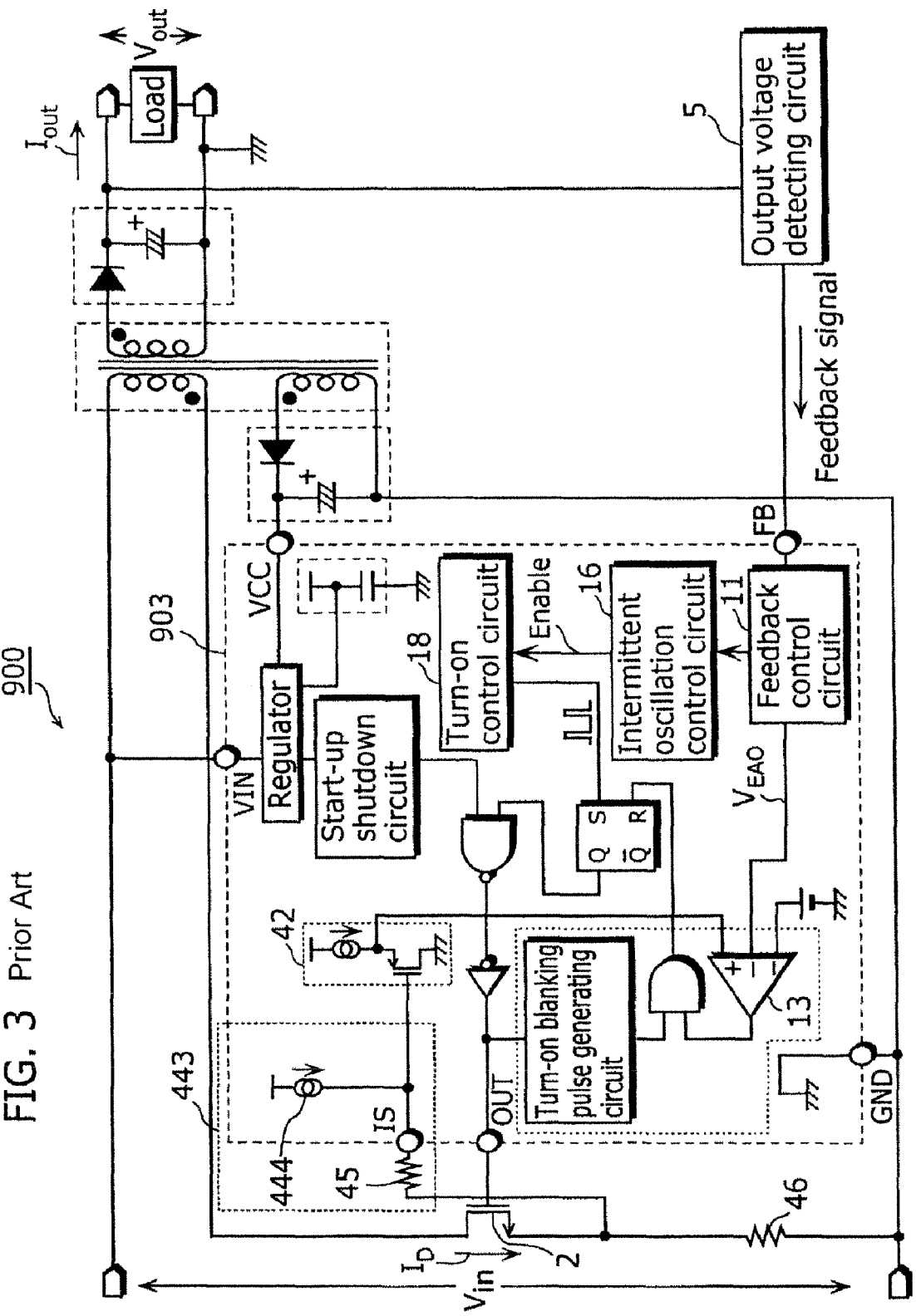
FIG. 3 shows a circuit diagram exemplifying a structure of another conventional switching power supply apparatus.
Figure 4:
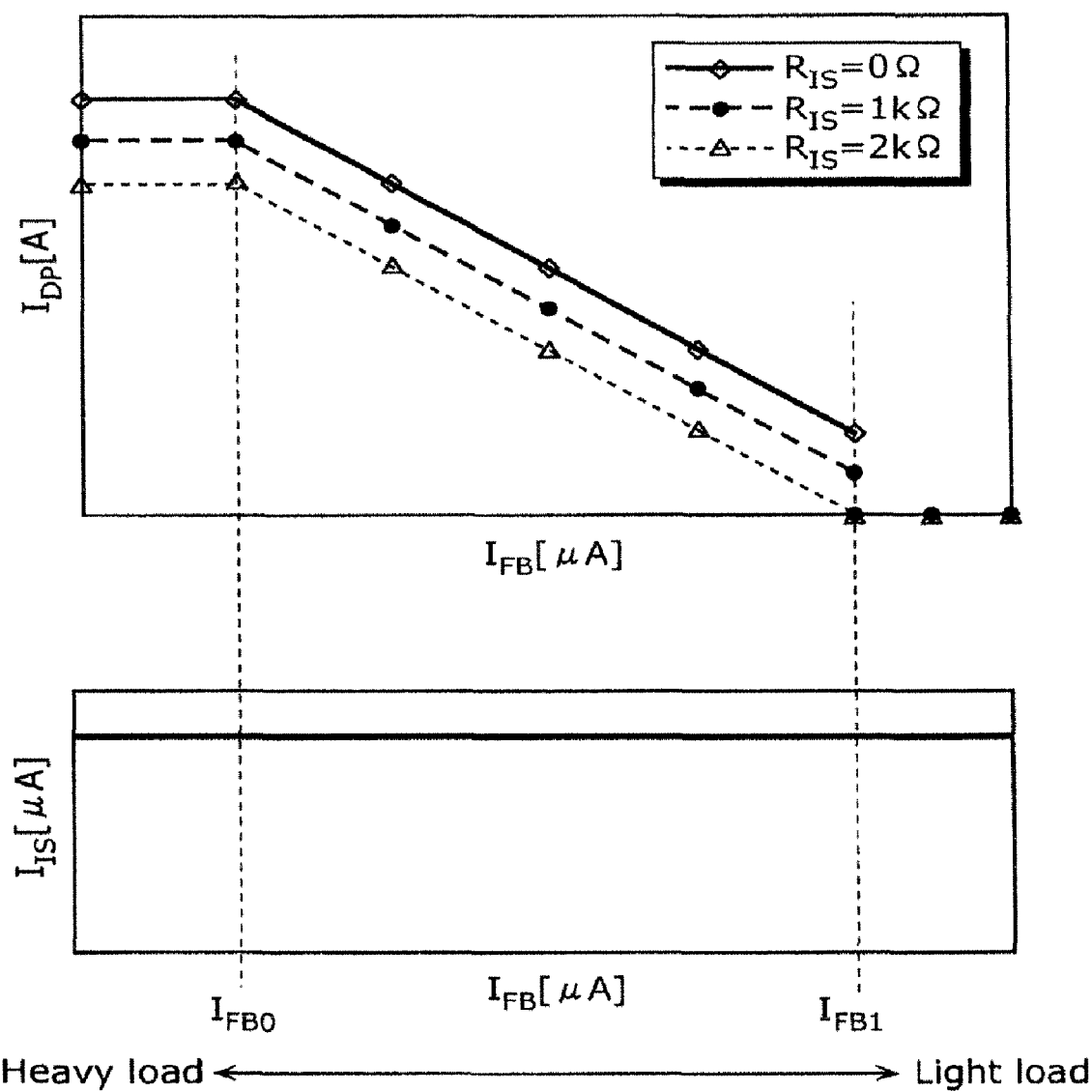
FIG. 4 graphically shows (i) an offset current (bottom), and (ii) a current flowing into a switching element when an offset adjusting resistor is changed (top), both currents which are with respect to a feedback current observed in the other conventional switching power supply apparatus.
Figure 5:
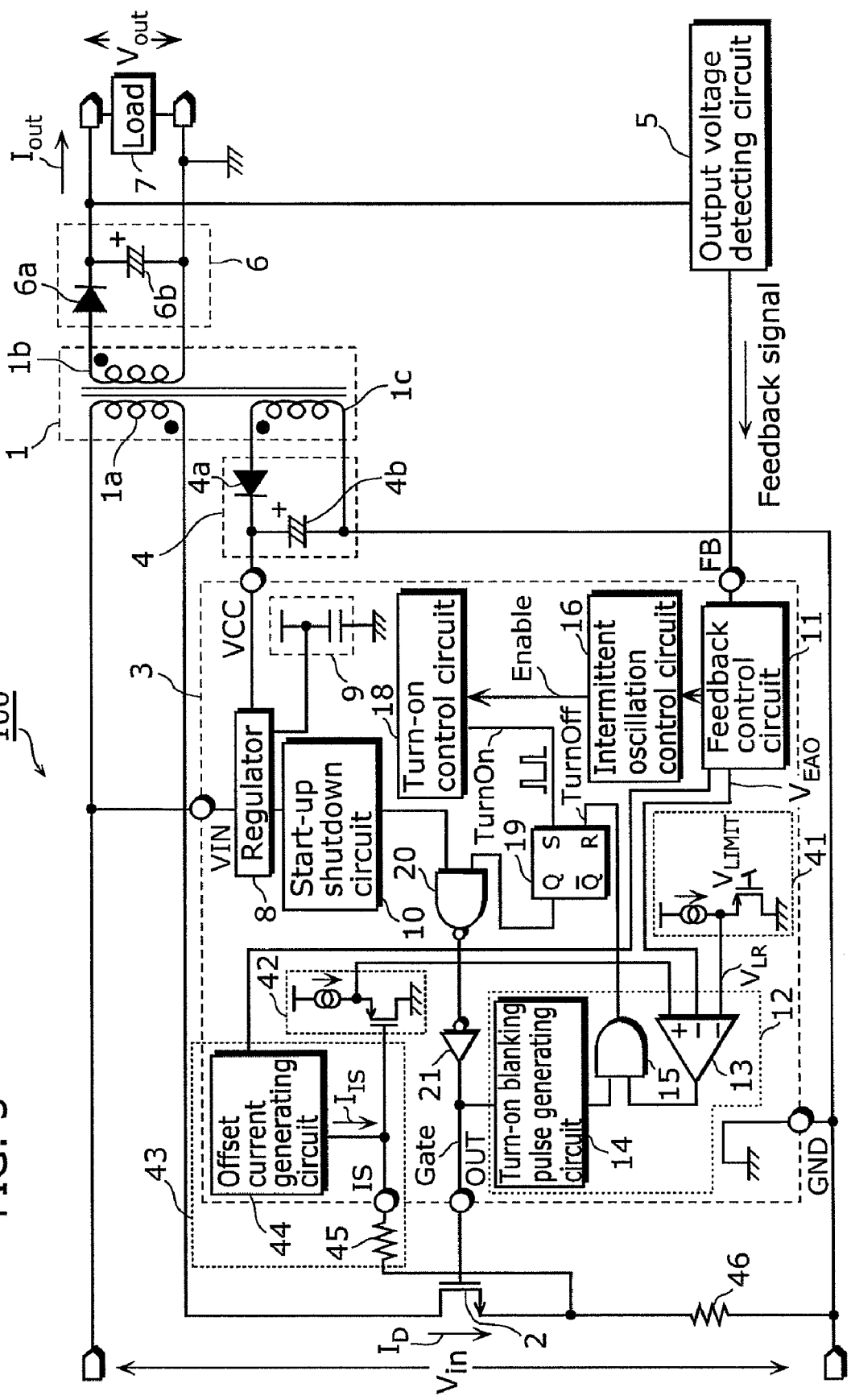
FIG. 5 shows a circuit diagram exemplifying a structure of a switching power supply apparatus in accordance with Embodiment 1 of the present invention.

FIG. 5 shows a circuit diagram exemplifying a structure of a switching power supply apparatus 100 in accordance with Embodiment 1 of the present invention. A control circuit 3 of the switching power supply apparatus 100 is realized in a form of a single-chip semiconductor device used for switching power supply control.

In FIG. 5, a transformer 1 has primary winding 1a, secondary winding 1b, and auxiliary winding 1c. Polarities between the primary winding 1s and the secondary winding 1b are reversed. An alternating current voltage obtained from the secondary winding 1b is converted into an output direct current voltage by an output voltage generating unit 6 including a diode 6a and a condenser 6b. Then, the output direct current voltage is supplied to a load 7. The switching power supply apparatus 100 is a flyback power supply apparatus.

The primary winding 1a is connected to a first terminal (drain) of the switching element 2, such as a power MOSFET. A second terminal (source) of the switching element 2 is connected to a current detecting resistor 46; namely, a switching element current detecting circuit. A third terminal of the switching element 2; namely a control electrode (gate), receives the output signal of a control circuit 3 to perform on-off switching control.

The semiconductor device to realize the control circuit 3 includes, as external input and output terminals, six terminals, such as a VIN terminal, a GND terminal, a VCC terminal, an FB terminal, an OUT terminal, and an IS terminal.

The VIN terminal is connected to the high-potential side of the input voltage $V_{in}$. The GND terminal, which is connected to the ground of the control circuit 3, is connected to the low-potential side of the input voltage $V_{in}$.

The VCC terminal connects (i) an output of a rectifying and smoothing circuit 4, including a diode 4a and a condenser 4b, with (ii) a regulator 8 incorporated into the control circuit 3. The VCC terminal (i) rectifies and smoothes an alternative voltage generated at the auxiliary winding 1c via the switching operation by the switching element 2, and (ii) inputs the rectified and smoothed alternative voltage into the control circuit 3 as an auxiliary power supply voltage VCC.

The FB terminal is used for inputting a feedback signal (a current from a photo-transistor, for example) into a feedback control circuit 11 in the control circuit 3, the feedback signal which is outputted from an output voltage detecting circuit 5.

The OUT terminal, which is an output terminal of the control circuit 3, is connected to the control electrode (gate) of the switching element 2.

The IS terminal is connected to the connecting point of the switching element 2 and the current detecting resistor 46 via the offset adjusting resistor 45.

The regulator 8 is connected to an internal circuit voltage source 9 in the control circuit 3, the VIN terminal, the VCC terminal, and a start-up shutdown circuit 10. When the input voltage $V_{in}$ is applied via the transformer 1, the regulator 8 supplies a current from the VIN terminal, via the VCC terminal, to the condenser 4b in the rectifying and smoothing circuit 4 which outputs the auxiliary power supply voltage VCC. Thus, the supplied current causes the auxiliary power supply voltage VCC to increase.

It is noted that when the VCC terminal voltage reaches a starting voltage, a current supply from the VIN terminal to the VCC terminal is cut. Thus, the current to the internal circuit is supplied by the condenser 4b in the rectifying and smoothing circuit 4 which outputs the auxiliary power supply voltage VCC. In addition, when the VCC terminal voltage decreases to the shutdown voltage, the current is supplied from the VIN terminal to the VCC terminal as observed before the starting, and then the VCC terminal voltage increases again. The internal circuit voltage source 9 is controlled by the regulator 8 so that the voltage of the internal circuit voltage source 9 is constant.

The start-up shutdown circuit 10, monitoring the VCC terminal voltage, controls oscillation and suspension of the switching element 2, depending on the degree of the VCC terminal voltage. The start-up shutdown circuit 10 outputs, to one of the inputs of an NAND circuit 20, (i) "H" level when the VCC terminal voltage reaches the starting voltage, and (ii) "L" level when the VCC terminal voltage decreases to the suspension voltage.

The feedback control circuit 11 determines a limitation level value of a current flowing into the switching element 2 so that the output voltage $V_{out}$ is maintained constant, depending on the feedback signal (the current $I_{FB}$ flowing from the FB terminal to the output voltage detecting circuit 5, for example) which is outputted from the output voltage detecting circuit 5 and inputted into the FB terminal of the control circuit 3. Then, the feedback control circuit 11 outputs the voltage $V_{EAO}$, representing the determined limitation level value, to the minus input of a comparator 13.

It is noted that the output voltage $V_{EAO}$ provided from the feedback control circuit 11 is controlled to cause the current flowing into the switching element 2 to (i) decrease when the load is light and the output voltage $V_{out}$ increases, and (ii) increase when the load is heavy and the output voltage $V_{out}$ decreases.

Figure 6:
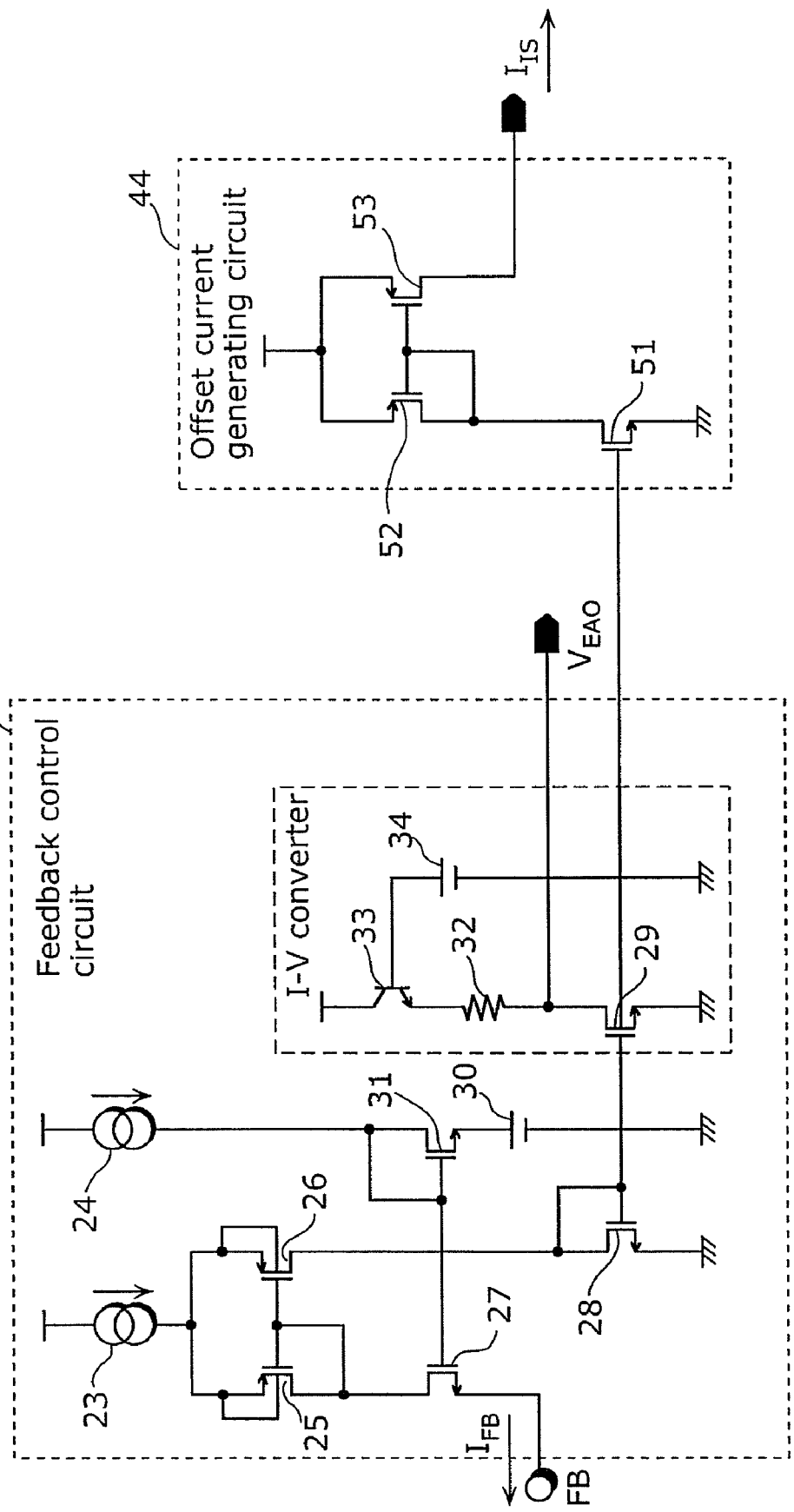
FIG. 6 is a circuit diagram exemplifying structures of a feedback control circuit and an offset current generating circuit in accordance with Embodiment 1.

FIG. 6 is a circuit diagram exemplifying circuit structures of the feedback control circuit 11 and an offset current generating circuit 44.

The details of the feedback control circuit 11 shall be described here with reference to FIG. 6. The details of the offset current generating circuit 44 shall be described hereinafter.

The feedback control circuit 11 includes: constant current sources 23 and 24; p-type MOSFETs 25 and 26; n-type MOSFETs 27, 28, 29, and 31; constant voltage sources 30 and 34; a resistor 32; and an NPN bipolar transistor 33.

The n-type MOSFETs 29 and 31, the resistor 32, and the NPN bipolar transistor 33 make up an I-V converter. Each pair of the p-type MOSFETs 25 and 26, and the n-type MOSFETs 28 and 29 makes up a current mirror circuit.

It is noted that the constant current sources 23 and 24 are used for limiting the current when the FB terminal short-circuits with the GND short-circuit. The current $I_{FB}$, flowing from the FB terminal, is voltage-converted to the voltage $V_{EAO}$ by the I-V converter. Here, the voltage $V_{EAO}$ is determined by the current flowing into the resistor 32 and varies based on Equation 1.

$$V_{EAO} = V_{RO} - V_{be} R_0 \times O_0 \qquad \text{(Equation 1)}$$

Here, the following holds:
$V_{EAO}$: An output voltage of the I-V converter;
$V_{RO}$: A constant voltage value of the constant voltage source 34;
VBA: A voltage, between B and E, of the NPN bipolar transistor 33;
$R_0$: A resistor value of the resistor 32; and
$I_0$: A current flowing into the resistor 32.

Equation 1 shows that as the current $I_0$ flowing into the resistor 32 is greater, the voltage $V_{EAO}$ decreases further. In other words, as the current $I_{FB}$ flowing from the FB terminal is greater, the $V_{EAO}$ decreases further. The decreasing $V_{EAO}$ causes the current flowing into the switching element 2 to decrease. Further, as the $I_{FB}$ flowing from the FB terminal is smaller, the $V_{EAO}$ increases further. The increasing $V_{EAO}$ causes the current flowing into the switching element 2 increase.

Here, FIG. 5 is referred to again. An overcurrent protection level setting circuit 41 includes, for example, (i) a constant voltage source which outputs the voltage $V_{LIMIT}$ corresponding to the maximum value of the output voltage provided from switching element current detecting circuit, and (ii) a level shift circuit having a constant current source and a p-type MOSFET. Thus, the overcurrent protection level setting circuit 41 sets the overcurrent protection level value $I_{LIMIT}$ of the current flowing into the switching element 2.

A turn-off control circuit 12 includes: the comparator 13 receiving three voltage signals; an turn-on blanking pulse generating circuit 14 receiving the output signal Gate of a driving circuit 21; and an AND circuit 15 receiving the outputs of the comparator 13 and the turn-on blanking pulse generating circuit 14.

The switching element current detecting circuit; namely the current detecting circuit of the switching element 2, includes for example only the current detecting resistor 46, and outputs a sense voltage determined by the product of the current flowing into the switching element 2 and the resistor value of the current detecting resistor 46. An offset voltage is added to the sense voltage by an offset voltage adding circuit 43, and the sense voltage with the offset voltage added is outputted to the positive input of the comparator 13 via the level shift circuit 42.

In the case where the sense voltage with the offset voltage added is equal to either the output voltage $V_{EAO}$ of the feedback control circuit 11 or the output voltage $V_{LR}$ of the overcurrent protection level setting circuit 41, the comparator 13 outputs the "H" level signal to one of the inputs of the AND circuit 15. It is noted that a specific example of the circuit diagram of the offset voltage adding circuit 43 shall be detailed in the description of the operation hereinafter.

After the driving circuit 21 outputs the Gate signal which turns on the switching element 2, the turn-on blanking pulse generating circuit 14 outputs, during a certain blanking period, an "L" level blanking signal to the other one of the inputs of the AND circuit 15. This prevents the switching element 2 from being accidentally turned off due to false detection of a capacitive spike current caused by the capacity of the switching element 2 itself. After the blanking period, an "H" level blanking signal is outputted from the turn-on blanking pulse generating circuit 14 to the other one of the inputs of the AND circuit 15.

In the case where (i) a blanking period set, when the switching element 2 turns on, by the turn-on blanking pulse generating circuit 14 has elapsed, and (ii) a current, having a value determined by either the voltage $V_{EAO}$ provided from the feedback control circuit 11 or the voltage $V_{LR}$ provided from the overcurrent protection level setting circuit 41, flows into the switching element 2, both of the input signals into the AND circuit 15 are the "H" level. Thus, the output signal from the AND circuit 15 is the "H" level.

Figure 7:
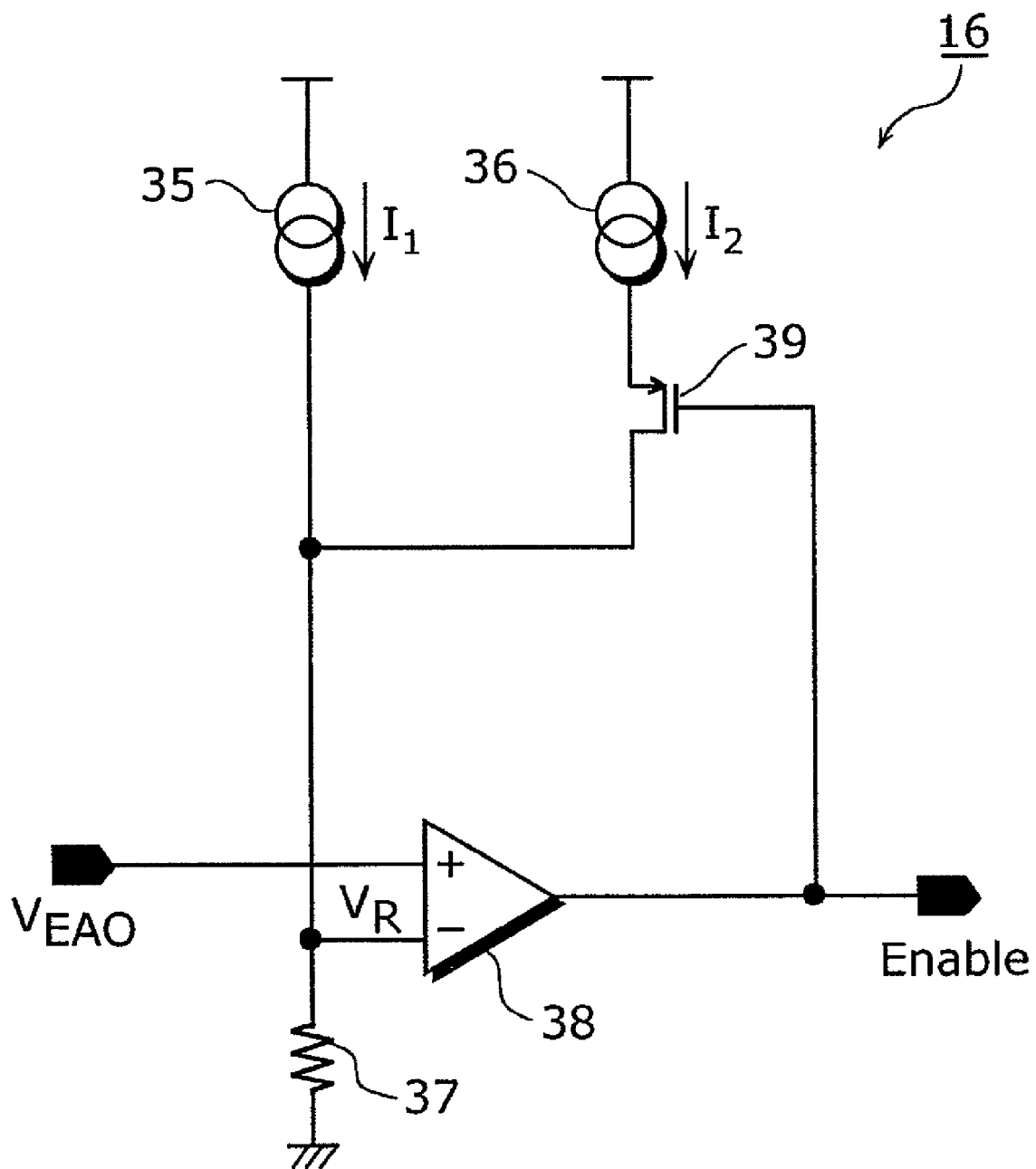
FIG. 7 is a circuit diagram exemplifying a structure of an intermittent oscillation control circuit in accordance with Embodiment 1.

FIG. 7 is a circuit diagram exemplifying a circuit structure of the intermittent oscillation control circuit 16. The intermittent oscillation control circuit 16 includes constant current sources 35 and 36, a resistor 37, a comparator 38, and a p-type MOSFET 39. The constant current sources 35 and 36 respectively output constant currents "$I_1$" and "$I_2$". The resistor value R is observed in the resistor 37.

The intermittent oscillation control circuit 16 compares the output voltage $V_{EAO}$ provided from the feedback control circuit 11 with a reference voltage $V_R$ of the comparator 38 to output an Enable signal indicating the comparison result. The reference voltage $V_R$ switches between $V_{R1}$ and $V_{R2}$ which is higher than $V_{R1}$ due to the hysteresis below. Specifically, when $V_{EAO}$ exceeds $V_{R2}$, the Enable signal is the "H" level, and the p-type MOSFET 39 turns off. Accordingly, the reference voltage $V_R$ is switched as follows:

$$V_{R1} = R \times I_1 \quad \text{(Equation 2)}$$

When $V_{EAO}$ goes below $V_{R1}$, the Enable signal is the "L" level, the p-type MOSFET 39 turns on, and the reference voltage $V_R$ is switched as follows:

$$V_{R2} = R \times (I_1 + I_2) \quad \text{(Equation 3)}$$

According to the hysteresis of the reference voltage $V_R$, the intermittent oscillation control circuit 16 outputs (i) the "H"-level Enable signal instructing execution of the switching operation when $V_{EAO}$ is high; namely, the output load is heavy, (ii) and the "L"-level Enable signal instructing suspension of the switching operation when $V_{EAO}$ is low; namely, an output load is light.

Figure 8:
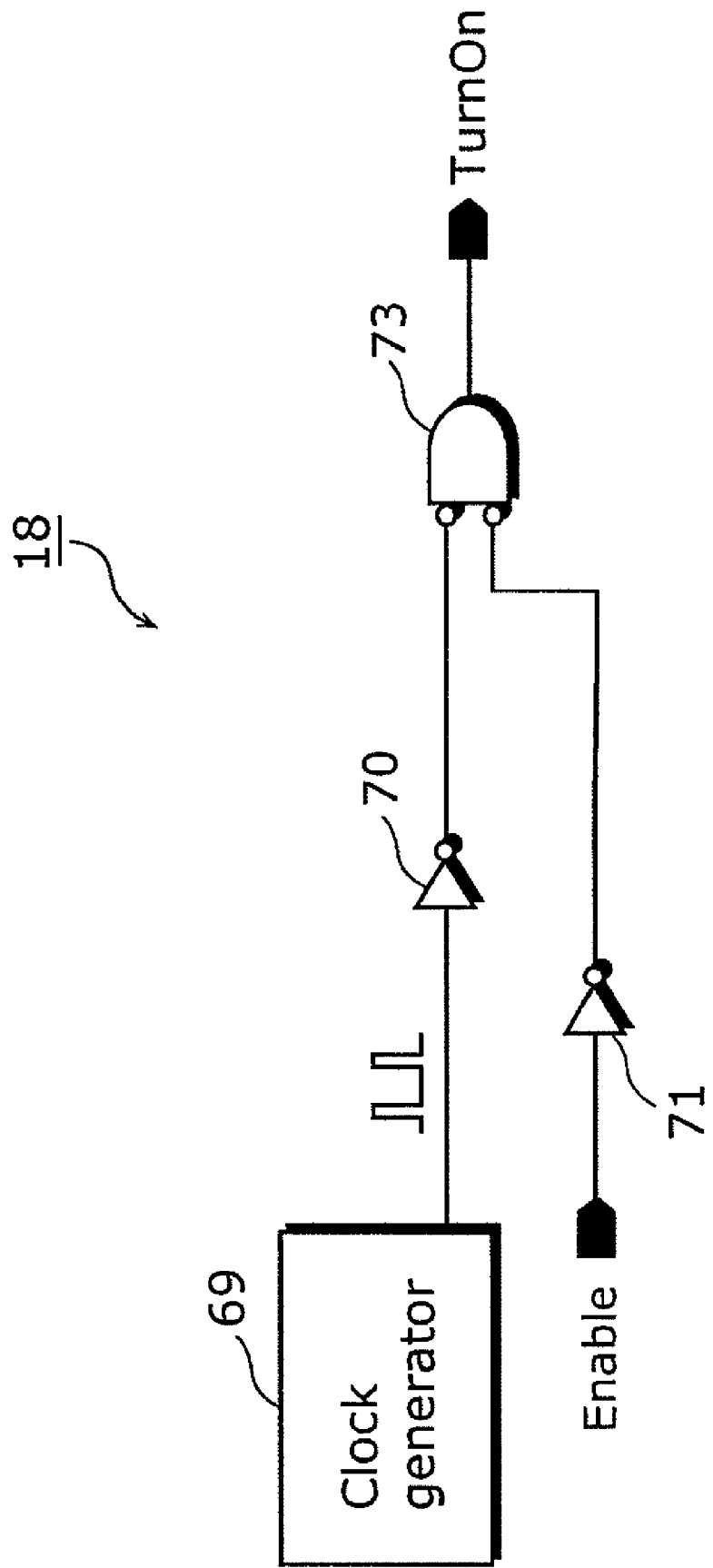
FIG. 8 is a circuit diagram exemplifying a structure of a turn-on control circuit in accordance with Embodiment 1.

FIG. 8 is a circuit diagram specifically exemplifying a circuit structure of a turn-on control circuit 18. The turn-on control circuit 18 includes a clock generator 69 which outputs a clock pulse which may also be used as a TurnOn signal. It is noted that the clock pulse may be any of a fixed frequency, a variable frequency, and a random periodic pulse. The clock pulse is inputted into one of the inputs of an NOR circuit 73 via an inverter 70. In addition, the Enable signal is inputted into the other one of the inputs of the NOR circuit 73 via an inverter 71. Only during the "H" level in which the Enable signal executes the switching operation, the NOR circuit 73 outputs the clock pulse as the TurnOn signal.

Here, FIG. 5 is referred to again. The TurnOn signal is inputted into the set-input "S" of an RS flip-flop 19.

When the switching power supply apparatus 100 is in the starting-completed state, the start-up shutdown circuit 10 outputs the "H"-level signal to one of the inputs of the NAND circuit 20. Since the turn-on control circuit 18 inputs the "H"-level TurnOn signal into the set-input "S" of the RS flip-flop 19, the output "Q" of the RS flip-flop 19 is the "H"-level. Thus, the "H"-level signal is inputted into the other one of the inputs of the NAND circuit 20.

Hence the output signal of the NAND circuit 20 is the "L"-level, and thus the output signal of the driving circuit 21 is the "H"-level. Hence, the switching element 2 turns on.

Meanwhile, when the switching element 2 turns on, followed by flowing into the switching element 2 either (i) a current responding to the feedback signal $I_{FB}$ provided from the output voltage detecting circuit 5 after the turn-on blanking period, or (ii) the current $I_{LIMIT}$ in the overcurrent protection level set by the overcurrent protection level setting circuit 41, the "H"-level signal provided from the AND circuit 15 is inputted into the reset input "R" of the RS flip-flop 19.

Thus, the output "Q" of the RS flip-flop 19 is switched to the "L"-level, and one of the inputs of the NAND circuit 20 is the "L"-level. This makes the output signal of the driving circuit 21 the "L"-level, and the switching element 2 turns off.

The above signal processing involves executing the switching operation of the switching element 2. It is noted that the output voltage generating unit 6, including the diode 6a and the condenser 6b, is connected to the secondary winding 1b of the transformer 1. The output voltage generating unit 6 rectifies and smoothes an alternative voltage induced at the secondary winding 1b through the switching operation of the switching element 2 to generate the output voltage $V_{out}$. Then, the output voltage $V_{out}$ is supplied to the load 7.

Further, the output voltage detecting circuit 5, including for example a light-emitting diode (LED) or a zener diode, detects a voltage level of the output voltage $V_{out}$, and outputs a feedback signal required to control the switching operation of the switching element 2 so that the output voltage $V_{out}$ stabilizes at a predetermined voltage.

In the switching power supply apparatus, commercially-available alternating current power supply is rectified by a rectifier, such as a diode bridge, and smoothed by an input condenser to be transformed in the input voltage $V_{in}$. Then, the transformed input voltage $V_{in}$ is provided to the primary winding 1a of the transformer 1 used for power conversion.

Described below are the operations of the control circuit 3 and the switching power supply apparatus 100, shown in FIG. 5, and structured above.

Alternating current power supply provided by a commercially available power supply is rectified by a rectifier such as a diode bridge, and smoothed by an input condenser to be transformed to the input voltage $V_{in}$. The input voltage $V_{in}$ is applied to the VIN terminal of the control circuit 3. Then, via the regulator 8, a charge current for starting flows into the condenser 4b connected to the VCC terminal. When the charge current causes the VCC terminal voltage of the control circuit 3 to reach the starting voltage set by the start-up shutdown circuit 10, the switching element 2 starts the control of the switching operation.

Omitted in FIG. 5 is that, during the starting of the switching power supply apparatus 100, a starting pulse is generated according to the output signal provided from the start-up shutdown circuit 10. Then, the switching element 2 turns on.

Here, the secondary-side output voltage $V_{out}$ is low during the starting, and thus the feedback signal provided from the output voltage detecting circuit 5 does not enter the feedback control circuit 11. Hence, the conversion voltage $V_{EAO}$ of the I-V converter in the feedback control circuit 11 is high, and the current flowing through the switching element 2 is controlled by the current $I_{LIMIT}$ in the overcurrent protection level set by the overcurrent protection level setting circuit 41.

Once the switching element 2 turns on, a current flows into the switching element 2. Depending on the degree of the current flowing into the switching element 2, a voltage is inputted into the positive input of the comparator 13 via the offset voltage adding circuit 43 and the level shift circuit 42. When the output signal provided from the level shift circuit 42 increases to be equal to or greater than the voltage applied to one of the minus inputs of the comparator 13 after elapsing of the blanking period generated by the turn-on blanking pulse generating circuit 14, both of the inputs of the AND circuit 15 receive the "H"-level signals. Then, the AND circuit 15 outputs the "H"-level signal to the reset-input "R" of the RS flip-flop 19, and the switching element 2 turns on.

When the switching element 2 turns off, the turn-on control circuit 18 outputs the "H"-level TurnOn signal to the set-input "S" of the RS flip-flop 19. Then, the switching element 2 turns on again.

Repetition of the above switching operation increases the output voltage $V_{out}$. When the output voltage $V_{out}$ is equal to or greater than a voltage predetermined by the output voltage detecting circuit 5, the output voltage detecting circuit 5 controls the control circuit 3, so that the control circuit 3 provides the current $I_{FB}$, as the feedback signal, from the FB terminal. Depending on the degree of the $I_{FB}$, the output voltage $V_{EAO}$ provided from the I-V converter in the feedback control circuit 11 decreases. When the voltage $V_{EAO}$ goes below the output voltage $V_{LR}$ of the overcurrent protection level setting circuit 41, the current flowing into the switching element 2 decreases.

Hence, the on-duty of the switching element 2 changes into an appropriate state. Specifically, the switching element 2 is: turned on by an output pulse signal provided from the turn-on control circuit 18; and turned off when the current flowing into the switching element 2 reaches either (i) a current level determined by the current $I_{FB}$ flowing from the FB terminal, or (ii) the overcurrent protection level.

In other words, the current flows into the switching element 2 for: a short period under the light load in supplying a small current to the load 7; and a long period under the heavy load in supplying a large current to the load 7.

As described above, the control circuit 3 controls the current flowing into the switching element 2 according to the power supplied to the load 7 of the switching power supply apparatus, and changes the on-duty of the switching element 2.

Figure 9:
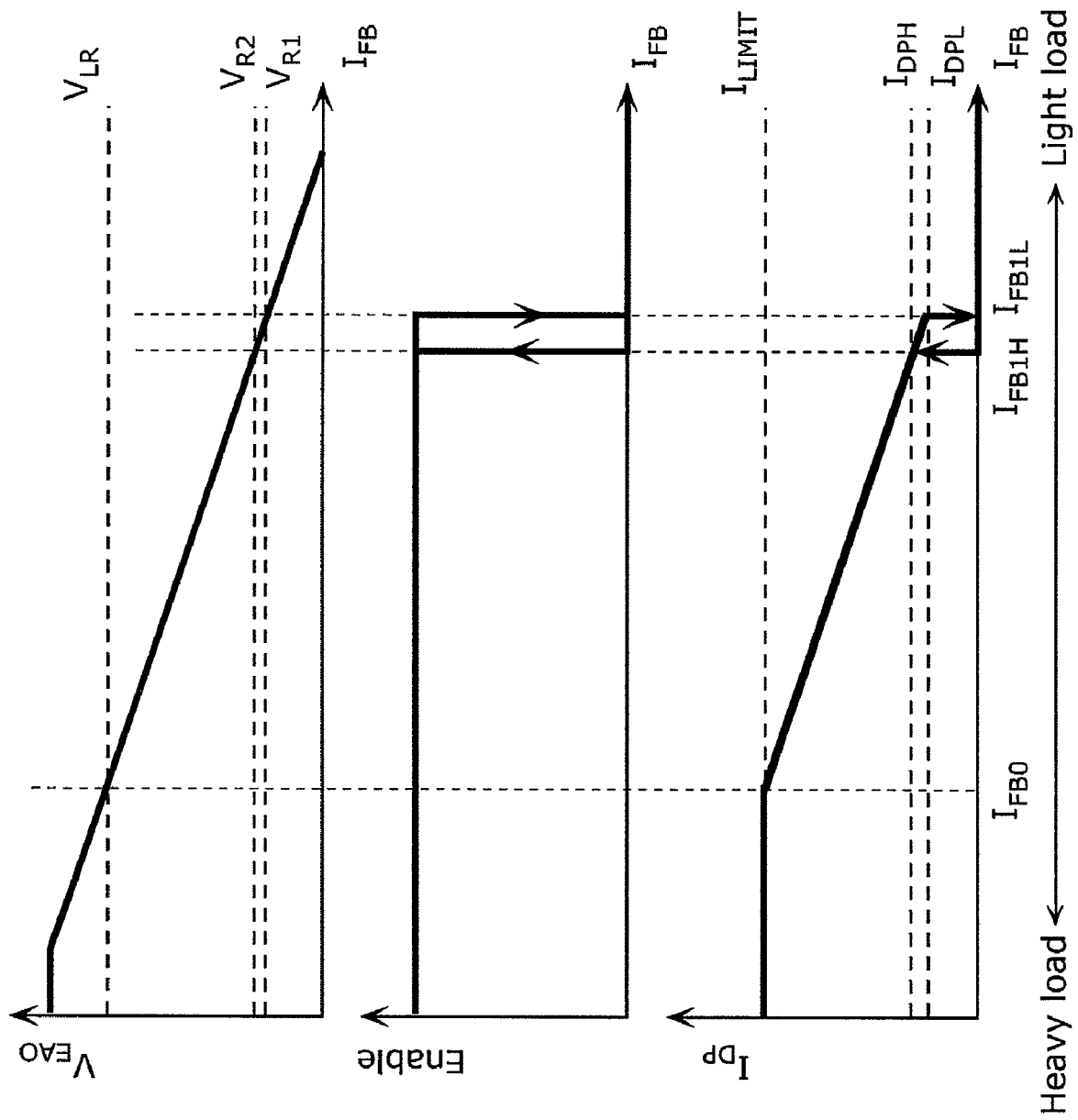
FIG. 9 graphically shows (i) an output voltage of the feedback control circuit (top), (ii) an output signal of the intermittent oscillation control circuit (middle), and (iii) a peak current flowing into a switching element (bottom), all of which are with respect to a feedback current observed in the switching power supply apparatus in accordance with Embodiment 1.

FIG. 9 graphically shows relationships between the output voltage $V_{EAO}$ of the feedback control circuit 11, the output signal Enable of the intermittent oscillation control circuit 16, and the peak current $I_{DP}$ flowing through the switching element 2, all of which are with respect to the current $I_{FB}$ flowing from the FB terminal, when the switching power supply apparatus 100 executes the above switching operation. FIG. 9 shows, in any given unit, the voltage $V_{EAO}$, the Enable signal, and the peak current $I_{DP}$ with respect to the current $I_{FB}$. According to FIG. 9, the current $I_{FB}$, flowing from the FB terminal, becomes greater toward the right. This represents that the current supplied to the load 7 becomes smaller (the output voltage $V_{out}$ becomes higher). It is noted that the Enable signal and the peak current $I_{DP}$ clearly show the hysteresis characteristics provided by the intermittent oscillation control circuit 16. Further assumed is that the offset voltage to be added to the sense voltage is fixed for the sake of convenience.

In the light-load state observing a small current supply to the load 7, the flowing current $I_{FB}$ increases in proportion to the rise of the output voltage $V_{out}$. The increase in the current $I_{FB}$ decreases the voltage $V_{EAO}$ provided from the I-V converter in the feedback control circuit 11.

When an absolute value of the current $I_{FB}$ increases to $I_{FB1L}$, the voltage $V_{EAO}$ goes lower than the reference voltage $V_{R1}$ of the comparator 38 in the intermittent oscillation control circuit 16, and then the output signal Enable of the intermittent oscillation control circuit 16 switches from the "H"-level to the "L"-level. As a result, the switching operation by the switching element 2 suspends, and the peak current $I_{DP}$, which has decreased to $I_{DPL}$, reduces to 0.

The suspension of the switching operation causes the output voltage $V_{out}$ to decrease, followed by the decrease in the current $I_{FB}$. This increases the voltage $V_{EAO}$ provided from the I-V converter in the feedback control circuit 11.

When the absolute value of the current $I_{FB}$ decreases to $I_{FB1H}$, the voltage $V_{EAO}$ goes higher than the reference voltage $V_{R2}$ of the comparator 38 in the intermittent oscillation control circuit 16, and then the output signal Enable of the intermittent oscillation control circuit 16 switches from the "L"-level to the "H"-level. As a result, the switching operation by the switching element 2 is executed, using the peak current $I_{DPH}$.

In the case where the current supply to the load 7 is great and the absolute value of the current $I_{FB}$ is smaller than $I_{FBO}$, the peak current $I_{DP}$ flowing into the switching element 2 is limited to the current $I_{LIMIT}$ in the overcurrent protection level.

Described here are the details of the offset voltage adding circuit 43 with reference to FIGS. 5 and 6.

The offset voltage adding circuit 43 includes the offset adjusting resistor 45 and the offset current generating circuit 44. Here, the offset adjusting resistor 45 is connected to the connecting point located between the switching element 2 and the current detecting resistor 46.

As shown in FIG. 6, the offset current generating circuit 44 includes the n-type MOSFET 51, and the p-type MOSFETs 52 and 53. Along with the n-type MOSFET 28 in the feedback control circuit 11, the n-type MOSFET 51 forms a current mirror circuit. The offset current generating circuit 44 provides the current $I_{IS}$, as the feedback signal, to the IS terminal. Here, the current $I_{IS}$ is proportional to the absolute value of the $I_{FB}$ flowing from the FB terminal of the control circuit 3.

The offset current $I_{IS}$ flows into the offset adjusting resistor 45 and the current detecting resistor 46. The offset adjusting resistor 45, the current detecting resistor 46, and the offset current $I_{IS}$ generate the offset voltage. The generated offset voltage is added to the sense voltage which is the output signal provided from the current detecting resistor 46, and the sense voltage is inputted to the level shift circuit 42.

In general, the current detecting resistor 46 (0.1Ω, for example) is significantly smaller than the offset adjusting resistor 45 (several kΩ, for example). Thus, the offset current $I_{IS}$ and the voltage generated by the current detecting resistor 46 may be ignored, so only the voltage generated by the offset current $I_{IS}$ and the offset adjusting resistor 45 may be taken into consideration as the offset voltage. Thus, the voltage $V_{IS}$ applied to the IS terminal is calculated as follows where the resistor value of the current detecting resistor 46 is "$R_S$", the resistor value of the offset adjusting resistor 45 is "$R_{IS}$", and the current flowing into the switching element is "$I_D$":

$$V_{IS}=R_S \times I_D + R_{IS} \times I_{IS} \quad \text{(Equation 4)}$$

Here, the offset current $I_{IS}$ is set in the control circuit 3; namely the semiconductor device, usually by the designer of the semiconductor device. Meanwhile, the resistor value of the offset adjusting resistor 45 can be freely changed by the designer of the switching power supply apparatus. In other words, the value of the offset voltage, added by the offset voltage adding circuit 43, can be freely set by the switching power supply apparatus designer.

As the absolute value of the current $I_{FB}$, which represents the feedback signal and flows from the FB terminal of the control circuit 3, is greater, the offset voltage adding circuit 43 adds a greater offset voltage to the sense voltage provided from the current detecting resistor 46. As a result, a signal, which: is seemingly greater than it actually is; and flows into the switching element 2, is inputted into the level shift circuit 42. Thus, the nominal increase from the actual current becomes greater as the absolute value of the current $I_{FB}$ is larger; that is, as the peak current $I_{DP}$ of the switching element 2 is smaller.

The level shift circuit 42 receives the voltage and shifts the received voltage as much as a threshold voltage "Vth" of the p-type MOSFET, and outputs the shifted voltage to the comparator 13. Compared with the case where no offset voltage adding circuit 43 is disposed, the amount of the current, flowing into the switching element 2 and required to invert the output of the comparator 13, decreases with respect to the amount corresponding to the offset voltage. Thus, the current flowing through the switching element 2 is limited.

The value of the offset voltage added by the offset voltage adding circuit 43 is determined out of the resistor value of the offset adjusting resistor 45 and the offset current $I_{IS}$ determined by the current $I_{FB}$. Here, the current $I_{FB}$ flows from the FB terminal of the control circuit 3 as the feedback signal. As the current $I_{FB}$ flowing from the FB terminal is smaller, the offset current $I_{IS}$ is smaller. Hence, a heavier load on the switching power supply apparatus makes the offset current $I_{IS}$ smaller.

In other words, a heavier load on the switching power supply apparatus makes smaller the value of the offset voltage added by the offset voltage adding circuit 43, which results in a smaller effect of the offset voltage addition. This makes possible reducing the effect of the offset voltage addition on the maximum peak current value, of the switching element, which initiates the overcurrent protection.

This can reduce the effect on the overcurrent protection accuracy in the case where the current value of the offset current $I_{IS}$ and the resistor value $R_{IS}$ of the offset adjusting resistor 45 vary due to production tolerance and temperature characteristics. Compared with the case where a fixed offset voltage is used, the variation can be reduced in the maximum output of the switching power supply apparatus.

Figure 10:
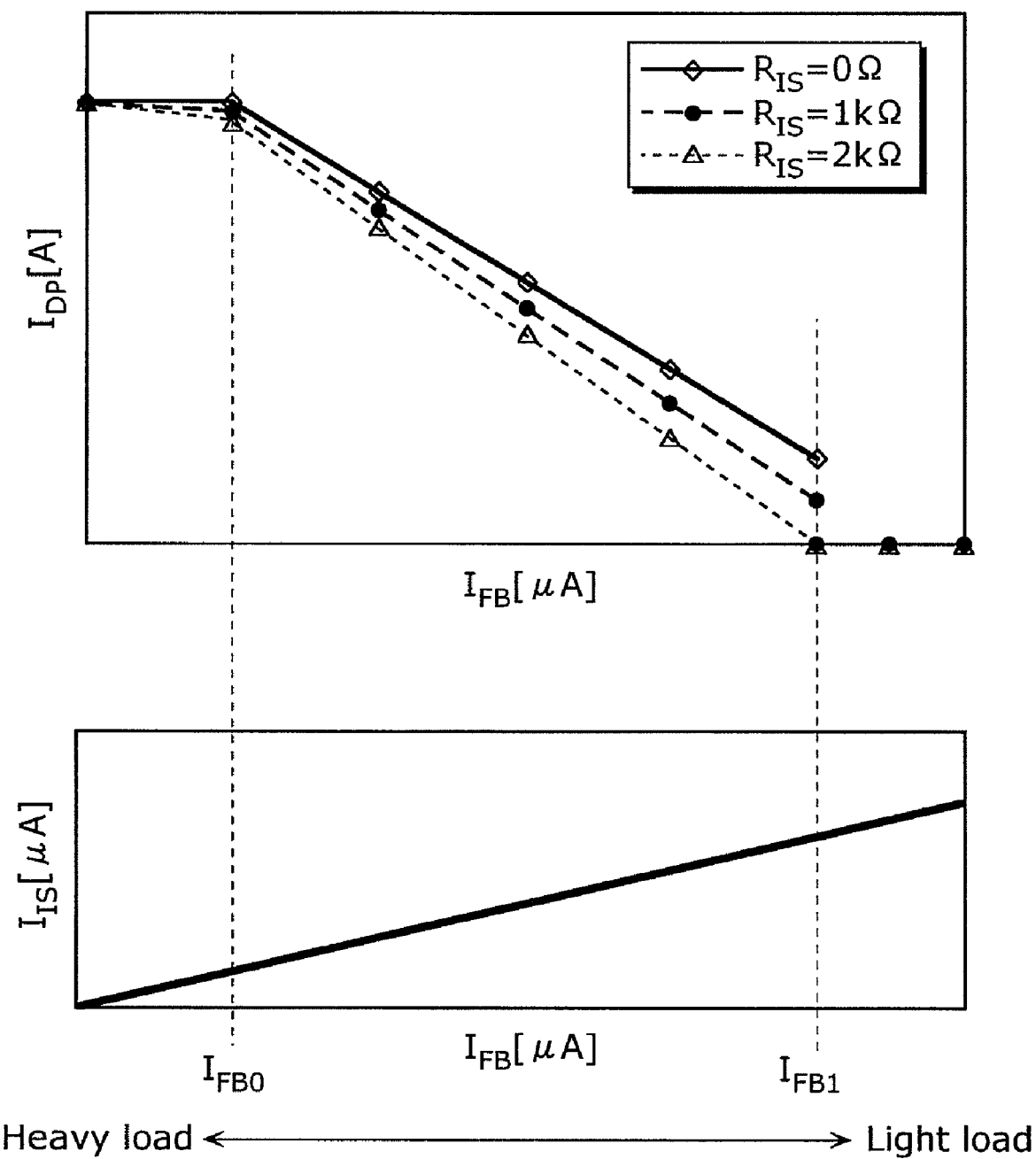
FIG. 10 graphically shows (i) an offset current (bottom), and (ii) a current flowing into a switching element when an offset adjusting resistor is changed (top), both currents which are observed with respect to the feedback current observed in the switching power supply apparatus in accordance with Embodiment 1.

FIG. 10 graphically shows relationships between the peak current $I_{DP}$ flowing through the switching element 2 and the offset current $I_{IS}$ in the switching power supply apparatus 100, the peak current $I_{DP}$ and the offset current $I_{IS}$ which are observed with respect to the $I_{FB}$ flowing from the FB terminal. The peak current $I_{DP}$ represents the case of the addition of the offset voltage determined by the resistor values $R_{IS}$ of three different offset adjusting resistors 45 (0Ω, 1 kΩ, and 2 kΩ). Omitted here are the hysteresis characteristics which the peak current $I_{DP}$ and the offset current $I_{IS}$ have.

According to the above, the control circuit 3 and the switching power supply apparatus 100 in accordance with Embodiment 1 can: freely set the peak current of the switching element 2 via the offset adjusting resistor 45 during the intermittent oscillation period; and reduce a variation of the overcurrent protection level in the case where the offset adjusting resistor 45 is changed. This makes possible maintaining the accuracy of the overcurrent protection, and optimizing the intermittent oscillation operation under the light load.

Embodiment 2

Describing hereinafter is a switching power supply apparatus in accordance with Embodiment 2 of the present invention. It is noted in Embodiment 2 that the drawings and the details shared with those in Embodiment 1 shall be omitted, accordingly.

Figure 11:
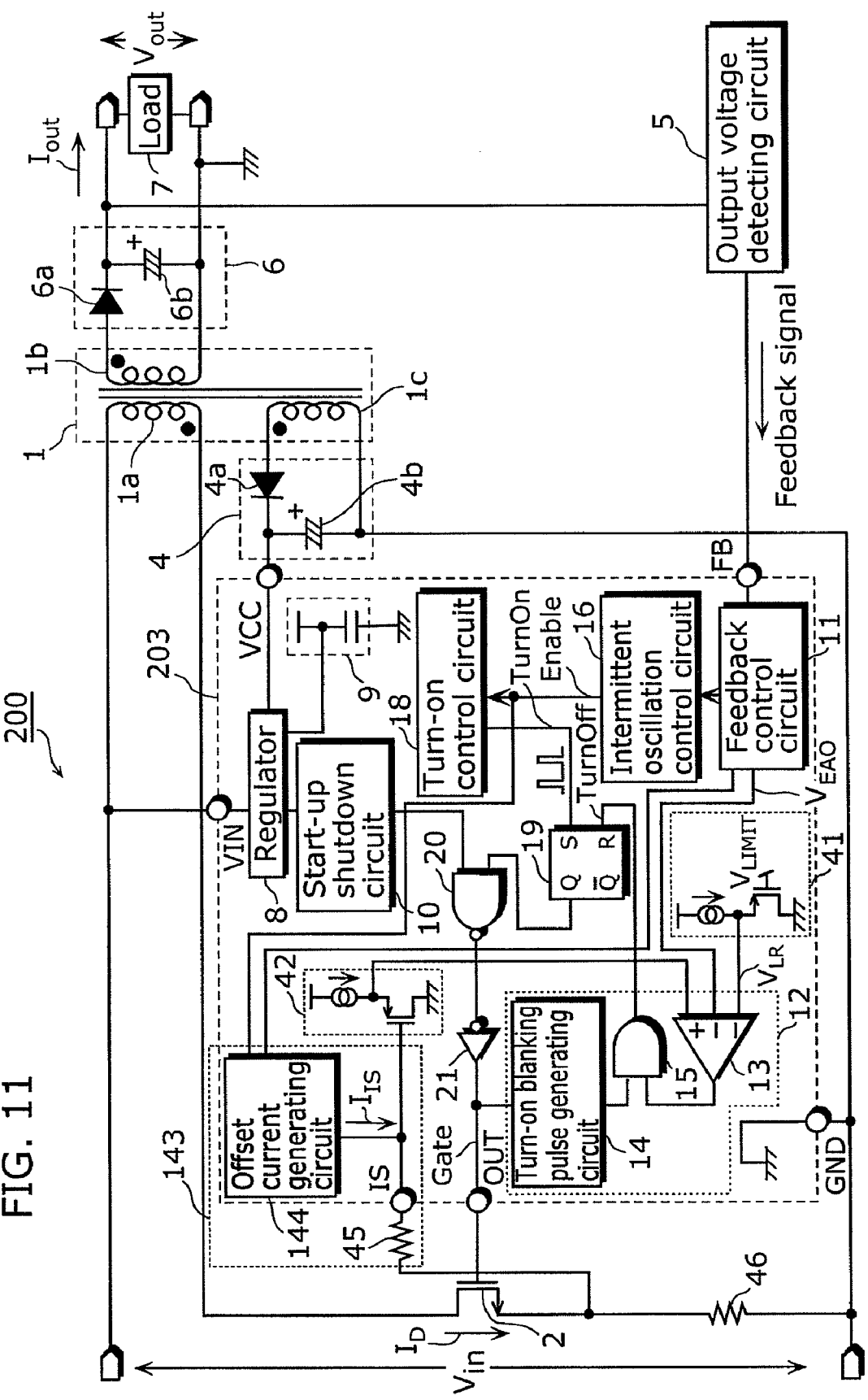
FIG. 11 shows a circuit diagram exemplifying a structure of a switching power supply apparatus in accordance with Embodiment 2 of the present invention.

FIG. 11 shows a circuit diagram exemplifying a structure of a switching power supply apparatus 200 in accordance with Embodiment 2. A control circuit 203 of the switching power supply apparatus 200 is realized in the form of a single-chip semiconductor device used for switching power supply control. The control circuit 203 is different from the control circuit 3 in accordance with Embodiment 1 with regard to an offset current generating circuit 144.

Figure 12:
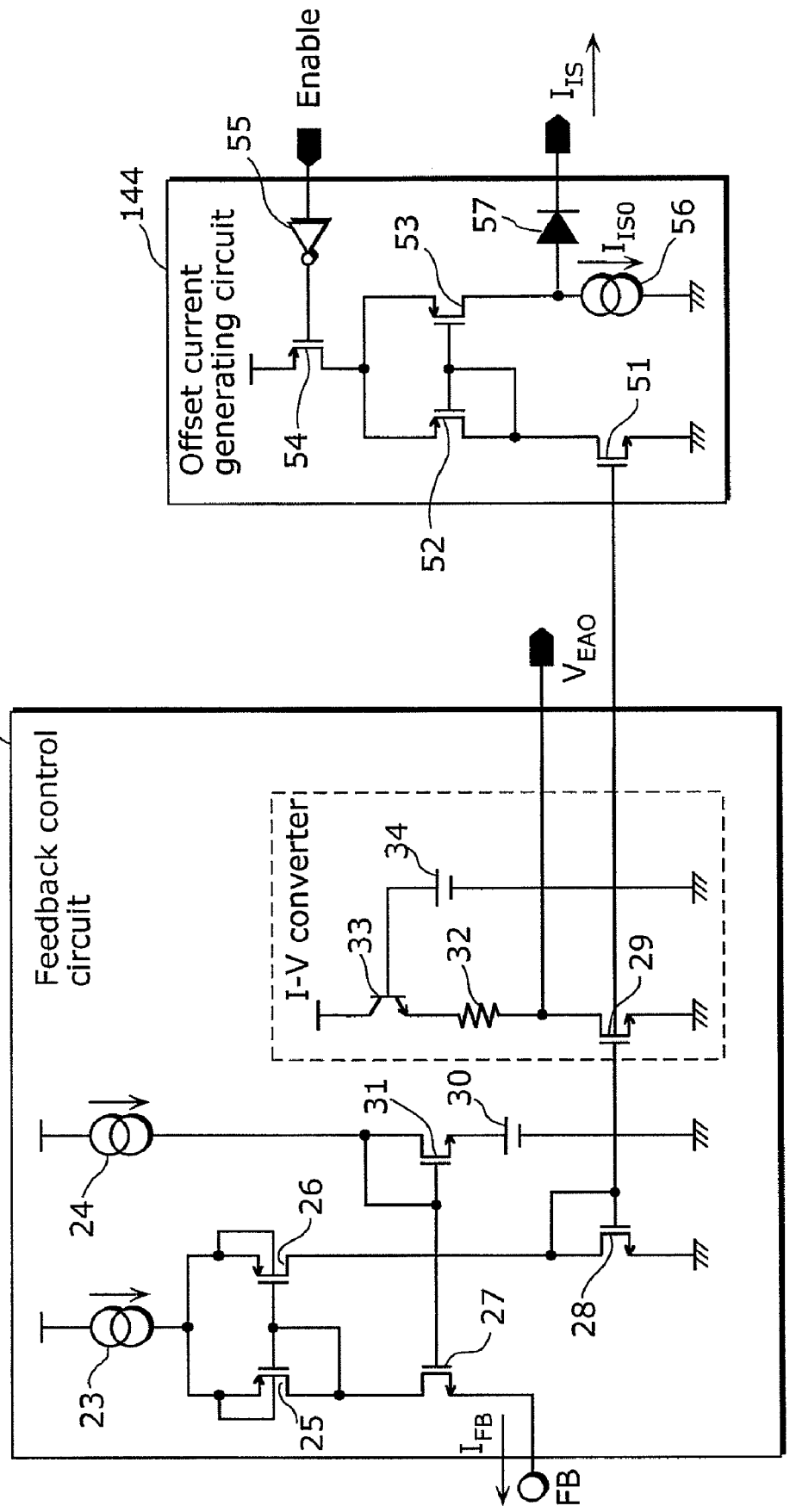
FIG. 12 is a circuit diagram exemplifying structures of a feedback control circuit and an offset current generating circuit in accordance with Embodiment 2.

FIG. 12 shows a circuit diagram exemplifying a structure of the offset current generating circuit 144. The offset current generating circuit 144 is shown along with the feedback control circuit 11 for the sake of convenience.

The offset current generating circuit 44 in accordance with Embodiment 1 supplies to the IS terminal the feedback signal provided from the output voltage detecting circuit 5 as the offset current $I_{IS}$. The feedback signal is a current in proportion to the current $I_{FB}$ flowing from the FB terminal.

Meanwhile, the offset current generating circuit 144 in accordance with the Embodiment 2 has (i) a constant current sink circuit 56 inserted between the drain and the GND of the p-type MOSFET 53, and (ii) a diode 57 inserted between the drain of the p-type MOSFET 53 and the IS terminal. The constant current sink circuit 56 and the diode 57 subtract the predetermined current $I_{ISO}$ from a current in proportion to the current $I_{FB}$. Then, the current $I_{ISO}$ is supplied to the IS terminal as the offset current $I_{IS}$. In the case where the amount of the current $I_{FB}$ flowing from the FB terminal is: equal to or smaller than a predetermined amount, the offset current $I_{IS}$ reduces to 0; and equal to or greater than the predetermined amount, the current in proportion to the $I_{FB}$ is supplied as the offset current $I_{IS}$.

Thus, in a range where the $I_{FB}$ is equal to the predetermined amount or smaller, the offset amount added by an offset voltage adding circuit 143 reduces to 0. This eliminates the effect of the offset voltage addition.

When the peak current value flowing through the switching element 2 is maximum; that is the $I_{FB}$ flowing from the FB terminal is equal to $I_{FBO}$ or smaller, the current $I_{ISO}$ flowing into the constant current sink circuit 56 may be set so that the offset current $I_{IS}$ reduces to 0. This may eliminate the effect of the offset voltage addition with respect to the maximum peak current value, of the switching element, which initiates the overcurrent protection.

Further, the offset current generating circuit 144 includes the p-type MOSFET 54 inserted between (i) the current mirror circuit having a pair of the p-type MOSFETs 52 and 53, and (ii) an internal circuit power supply voltage. The gate of the p-type MOSFET 54 receives the Enable signal via an inverter 55.

Thus, no current is supplied to the p-type MOSFETs 52 or 53, and the offset current $I_{IS}$ reduces to 0 during the period in which the Enable signal is in the "L"-level; that is, the period in which the intermittent oscillation control circuit 16 suspends the switching operation. This makes possible reducing the current consumed by the offset voltage adding circuit 143.

In order to further reduce the current consumed by the offset voltage adding circuit 143, the offset current $I_{IS}$ may be set to 0 during the period in which the switching element 2 turns off and turns on again. In this case, the Gate signal provided from the driving circuit 21, instead of the Enable signal, may be inputted in the inverter 55.

Figure 13:
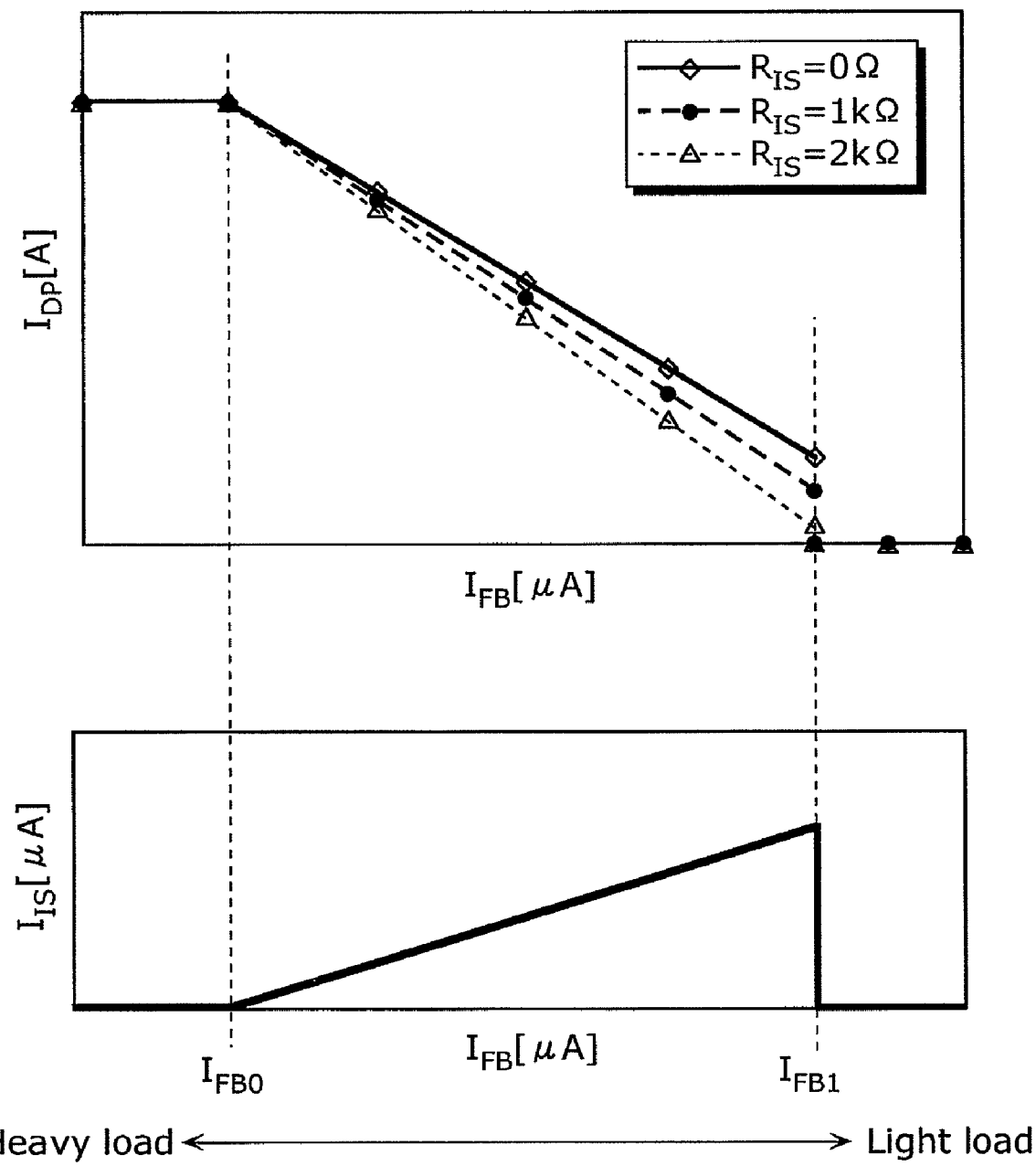
FIG. 13 graphically shows (i) an offset current (bottom), and (ii) a current flowing into a switching element when an offset adjusting resistor is changed (top), both currents which are observed with respect to a feedback current observed in the switching power supply apparatus in accordance with Embodiment 2.

FIG. 13 graphically shows relationships between the peak current $I_{DP}$ flowing through the switching element 2 and the offset current $I_{IS}$ in the switching power supply apparatus 200. Here, the peak current $I_{DP}$ and the offset current $I_{IS}$ are observed with respect to the $I_{FB}$ flowing from the FB terminal. As shown in FIG. 10, the peak current $I_{DP}$ represents the three different resistor values ($R_{IS}$=0Ω, 1 kΩ, and 2 kΩ) of the offset adjusting resistor 45. It is noted that the hysteresis characteristics which the peak current $I_{DP}$ and the offset current $I_{IS}$ have are omitted.

According to the above, the control circuit 203 and the switching power supply apparatus 200 in accordance with Embodiment 2 can: freely set the peak current of the switching element 2 via the offset adjusting resistor 45 during the intermittent oscillation period; and can reduce a variation of the overcurrent protection level in the case where the offset adjusting resistor 45 is changed. This makes possible maintaining the accuracy of the overcurrent protection, and optimizing the intermittent oscillation operation under the light load.

In is noted in the switching power supply apparatus 200 that the effect produced by the addition of the offset voltage on the accuracy of the overcurrent protection can be reduced to equal to or smaller than that observed in the switching power supply apparatus 100 described in Embodiment 1. In particular, $I_{IS}$ may be set to 0 in the range where $I_{FB} \leq I_{FBO}$ is assumed in order to eliminate the effect on the accuracy of the overcurrent protection.

During the period in which the intermittent oscillation control circuit 16 suspends the switching operation, the current consumed by the offset voltage adding circuit 143 can be reduced, which curves the power consumption of the switching power supply apparatus in the stand-by status.

Embodiment 3

Describing hereinafter is a switching power supply apparatus in accordance with Embodiment 3 of the present invention. It is noted in Embodiment 3 that the drawings and the details shared with those in Embodiments 1 and 2 shall be omitted, accordingly.

Figure 14:
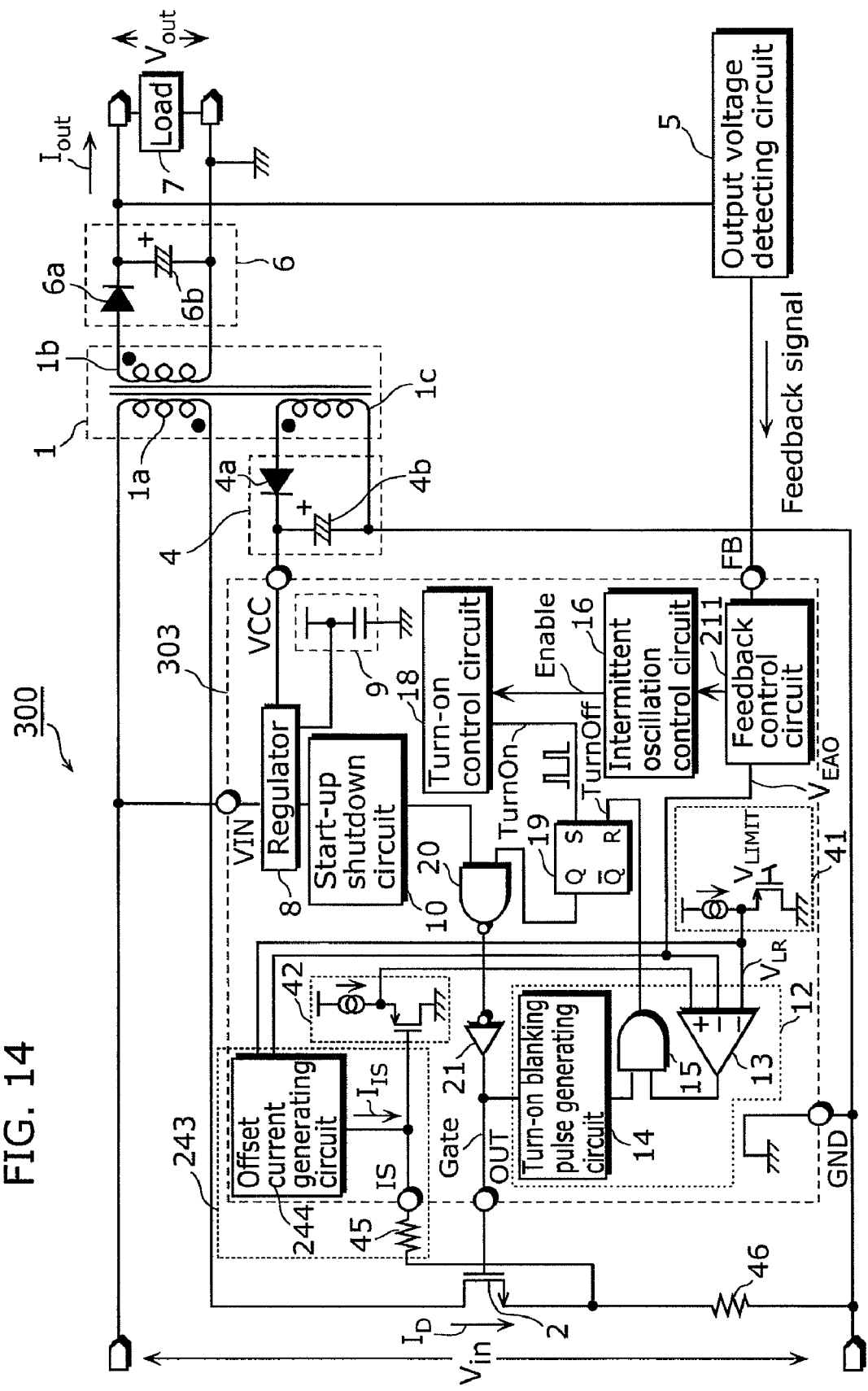
FIG. 14 shows a circuit diagram exemplifying a structure of a switching power supply apparatus in accordance with Embodiment 3 of the present invention.

FIG. 14 is a circuit diagram exemplifying a structure of a switching power supply apparatus 300 in accordance with Embodiment 3. A control circuit 303 of the switching power supply apparatus 300 is realized in the form of a single-chip semiconductor device used for switching power supply control. The control circuit 303 is different from the control circuit 3 in accordance with Embodiment 1 with regard to an offset current generating circuit 244 and a feedback control circuit 211.

Figure 15:
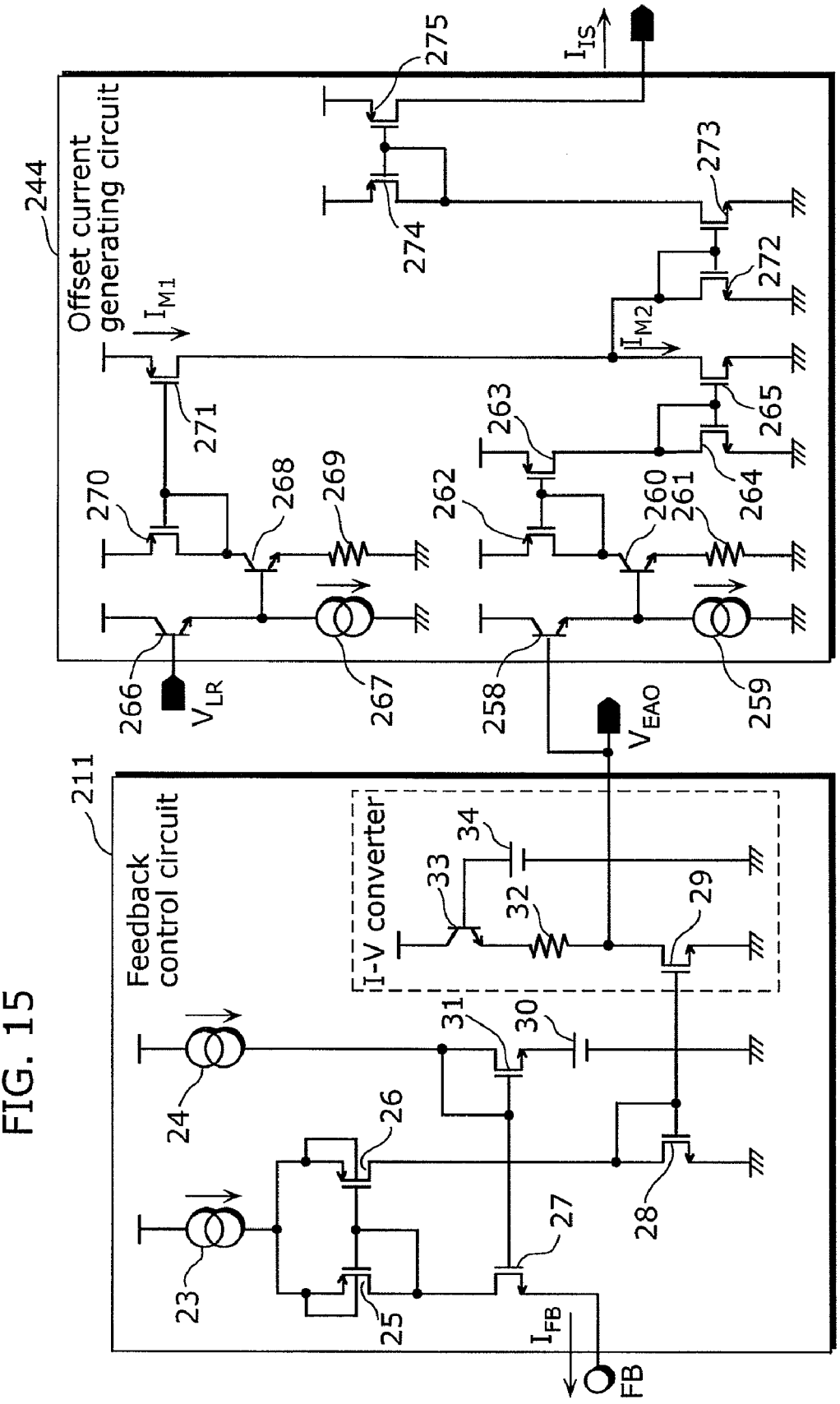
FIG. 15 is a circuit diagram exemplifying structures of an offset current generating circuit and a feedback control circuit in accordance with Embodiment 3.

FIG. 15 shows a circuit diagram exemplifying structures of the offset current generating circuit 244 and the feedback control circuit 211.

The offset current generating circuit 244 in Embodiment 3 receives the voltage $V_{EAO}$ and the output voltage $V_{LR}$, and outputs the offset current $I_{IS}$. Here, the voltage $V_{EAO}$ is transformed out of the current $I_{FB}$ by the I-V converter in the feedback control circuit 211, and the output voltage $V_{LR}$ is provided from the overcurrent protection level setting circuit 41. The feedback control circuit 211 has no wiring found in the feedback control circuit 11, compared with the feedback control circuit 11 shown in FIGS. 6 and 12. In the feedback control circuit 11 shown in FIGS. 6 and 12, the wiring is led from the gate of the n-type MOSFET 28, and used for mirroring the current $I_{FB}$.

The offset current generating circuit 244 includes: NPN bipolar transistors 258 and 260, a constant current sink circuit 259, a resistor 261 which are used for generating a current associated with the voltage $V_{EAO}$; p-type MOSFETs 262 and 263, and n-type MOSFETs 264 and 265 which are used for mirroring a current flowing through the resistor 261; NPN bipolar transistors 266 and 268, a constant current sink circuit 267, a resistor 269 which are used for generating a current associated with the voltage $V_{LR}$; p-type MOSFETs 270 and 271 which are used for mirroring a current flowing through the resistor 269; and n-type MOSFETs 272 and 273, and p-type MOSFETs 274 and 275 which are used for mirroring a differential current ($I_{M1}-I_{M2}$) between the current $I_{M1}$ flowing through the p-type MOSFET 271 and the current $I_{M2}$ flowing through the n-type MOSFET 265.

Described hereinafter is an operation of the offset current generating circuit 244. When $V_{EAO} \geq V_{LR}$ is held, $I_{M1}$ and $M_2$ are set to hold $I_{M1} \leq I_{M2}$, so that: no current flows into the n-type MOSFET 272; and the offset current $I_{IS}$ reduces to 0. When $V_{EAO} < V_{LR}$ is held, $I_{M1} > I_{M2}$ is held, so that: the current flows into the n-type MOSFET 272; and the current amplified by the p-type MOSFETs 274 and 275 is supplied to the IS terminal as the offset current $I_{IS}$. It is noted that the offset current $I_{IS}$ is expressed as follows:

$$I_{IS} = \alpha \times (I_{M1} - I_{M2}) = \beta \times (V_{LR} - V_{EAO}) \quad \text{(Equation 5)}$$

Here, α and β are determined by a mirroring ratio of the current mirror circuit in the offset current generating circuit 244. Since $V_{LR}$, generated by the overcurrent protection level setting circuit 41, maintains a constant voltage, a lower $V_{EAO}$ makes a greater offset current $I_{IS}$ when $V_{EAO} < V_{LR}$ is held.

Figure 16:
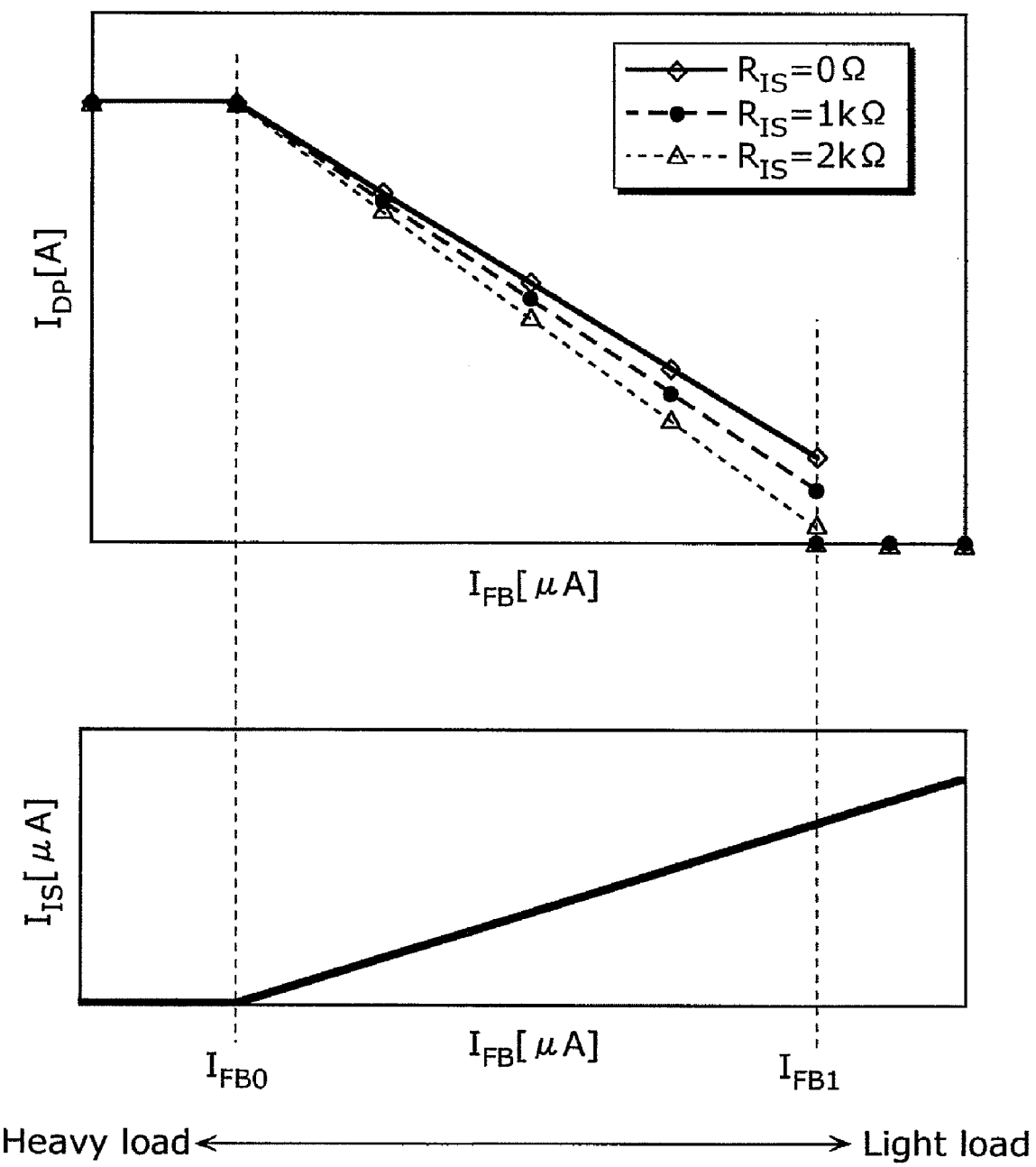
FIG. 16 graphically shows (i) an offset current (bottom), and (ii) a current flowing into a switching element when an offset adjusting resistor is changed (top), both currents which are observed with respect to a feedback current observed in the switching power supply apparatus in accordance with Embodiment 3.

FIG. 16 graphically shows relationships between the peak current $I_{DP}$ flowing through the switching element 2 and the offset current $I_{IS}$ in the switching power supply apparatus 300. Here, the peak current $I_{DP}$ and the offset current $I_{IS}$ are observed with respect to the current $I_{FB}$ flowing from the FB terminal. As shown in FIG. 10, the peak current $I_{DP}$ represents the three different resistor values ($R_{IS}$=0Ω, 1 kΩ, and 2 kΩ) of the offset adjusting resistor 45. It is noted that the hysterisis characteristics which the peak current $I_{DP}$ and the offset current $I_{IS}$ have are omitted.

According to the above, the control circuit 303 and the switching power supply apparatus 300 in accordance with Embodiment 3 can: freely set the peak current of the switching element 2 via the offset adjusting resistor 45 during the intermittent oscillation period; and reduce a variation of the overcurrent protection level in the case where the offset adjusting resistor 45 is changed. This makes possible maintaining the accuracy of the overcurrent protection, and optimizing the intermittent oscillation operation under the light load.

In is noted in the switching power supply apparatus 300 that the effect produced by the addition of the offset voltage on the accuracy of the overcurrent protection can be reduced to equal to or smaller than that observed in the switching power supply apparatus 200 described in Embodiment 2. In particular, $I_{IS}$ may be set to 0 in the range where $I_{FB} \leq I_{FBO}$ is assumed in order to eliminate the effect on the accuracy of the overcurrent protection.

It is noted as shown in the offset current generating circuit 144 in accordance with the Embodiment 2 that the p-type MOSFET may be inserted between (i) the current mirror circuit having a pair of the p-type MOSFETs 274 and 275 and (ii) an internal circuit power supply voltage in order to reduce the current consumed by the offset voltage adding circuit 243 during the period in which the intermittent oscillation control circuit 16 suspends the switching operation.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

For example, one of the modifications involves detecting the output voltage $V_{out}$, using the voltage of the auxiliary winding 1c.

Figure 17:
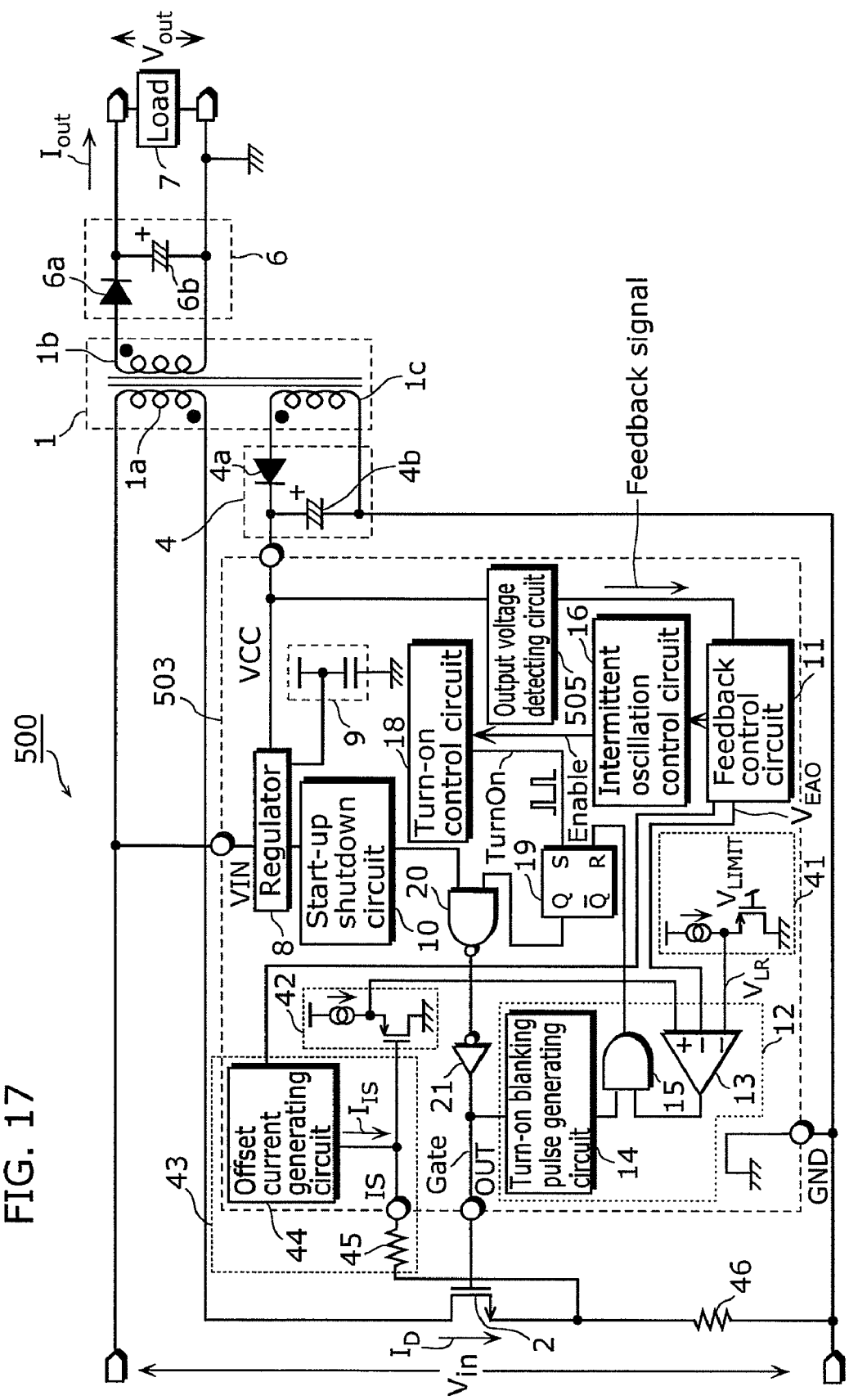
FIG. 17 shows a circuit diagram exemplifying a structure of a switching power supply apparatus in accordance with a modification of the present invention.

FIG. 17 is a circuit diagram exemplifying a structure of a switching power supply apparatus 500 in accordance with the above-mentioned modification. A control circuit 503 in the switching power supply apparatus 500 is the control circuit 3 of the Embodiment 1 with an output voltage detecting circuit 505 added. The output voltage detecting circuit 505 uses the voltage applied to the VCC terminal of the control circuit 503 to detect the output voltage $V_{out}$ so as to output the feedback signal to the feedback control circuit 11.

In addition, a resistor element and a capacitive element may be connected between the IS terminal and the GND terminal, and a filter circuit may be inserted therebetween.

INDUSTRIAL APPLICABILITY

A semiconductor device used for switching power supply control and a switching power supply apparatus of the present invention can be used for a switching power supply apparatus, such as an AC-DC converter and a DC-DC converter.

What is claimed is:

1. A semiconductor device used for controlling a switching power supply apparatus which supplies a regulated output direct current voltage to a load by causing a switching element to switch an input direct current voltage on and off, said semiconductor device comprising:
a turn-on control circuit which generates a turn-on signal which is used for periodically turning on the switching element;
a feedback control circuit which generates a first reference voltage indicating a limitation level value for a current flowing into the switching element, by referring to a feedback signal indicating a degree of the output direct current voltage, the limitation level value decreasing as the output direct current voltage becomes greater;
a current detecting terminal to which a sense voltage is applied, the sense voltage being greater as the current flowing into the switching element is greater;
an offset current generating circuit which provides an offset current from said current detecting terminal, the offset current being greater as the output direct current voltage indicated by the feedback signal is greater;
a turn-off control circuit which generates a turn-off signal which is used for turning off the switching element, by comparing the sense voltage applied to said current detecting terminal with the first reference voltage;
a driving circuit which turns on and off the switching element according to the turn-on signal and the turn-off signal;
an overcurrent protection level setting circuit which generates a second reference voltage indicating an overcurrent protection level value for the current flowing into the switching element; and
an intermittent oscillation control circuit which keeps the switching element off in the case where the first reference voltage is small enough to satisfy a predetermined reference,
wherein said turn-off control circuit generates the turn-off signal, by comparing the sense voltage applied to said current detecting terminal with each of the first reference voltage, and the second reference voltage.

2. The semiconductor device according to claim 1,
wherein said offset current generating circuit generates the offset current of which value continuously varies in conformity with variation in the feedback signal.

3. The semiconductor device according to claim 2,
wherein said offset current generating circuit generates the offset current of which value continuously increases as the first reference voltage decreases.

4. The semiconductor device according to claim 1,
wherein said offset current generating circuit reduces the value of the offset current to 0 in the case where the first reference voltage becomes greater than the second reference voltage.

5. The semiconductor device according to claim 1,
wherein said intermittent oscillation control circuit keeps the switching element off, by outputting an enable signal which is used for masking the turn-on signal, and
said offset current generating circuit holds the value of the offset current 0 while the enable signal keeps the switching element off.

6. A switching power supply apparatus comprising:
said semiconductor device according to claim 1;
the switching element which performs switching on an input direct current voltage according to control executed by said semiconductor device;
a converter which converts an input alternate current voltage into an output alternate current voltage, the input alternate current voltage being generated out of the input direct current voltage to be switched by said switching element;
a rectifying and smoothing circuit which converts the output alternate current voltage into an output direct current voltage;
an output voltage detecting circuit which generates a feedback signal indicating a degree of the output direct current voltage;
a current detecting circuit which generates a greater voltage as a greater current flows into said switching element; and
an offset adjusting resistor which connects an output of said current detecting circuit and a current detecting terminal.

7. The switching power supply apparatus according to claim 6,
wherein said offset adjusting resistor is a resistor element.

* * * * *